US012258248B2

(12) United States Patent
Dahlberg et al.

(10) Patent No.: US 12,258,248 B2
(45) Date of Patent: Mar. 25, 2025

(54) SCISSOR ARM, SCISSOR LIFT, AND METHOD OF FABRICATING A SCISSOR ARM

(71) Applicant: Car-O-Liner Group AB, Västra Frölunda (SE)

(72) Inventors: Cecil Dahlberg, Västerås (SE); Erik Vestholm, Kungsör (SE); Tony Andersson, Kungsör (SE); Tobias Bäckman, Köping (SE)

(73) Assignee: Car-O-Liner Group AB, Västra Frölunda (SE)

( * ) Notice: Subject to any disclaimer, the term of this patent is extended or adjusted under 35 U.S.C. 154(b) by 680 days.

(21) Appl. No.: 17/480,837

(22) Filed: Sep. 21, 2021

(65) Prior Publication Data

US 2023/0086692 A1 Mar. 23, 2023

(51) Int. Cl.
*B66F 7/06* (2006.01)
*B66F 7/08* (2006.01)
*B66F 7/28* (2006.01)

(52) U.S. Cl.
CPC ................ *B66F 7/065* (2013.01); *B66F 7/08* (2013.01); *B66F 7/28* (2013.01); *B66F 7/0666* (2013.01)

(58) Field of Classification Search
CPC ...... B66F 2700/052; B66F 3/25; B66F 7/065; B66F 7/08; B66F 7/28; B66F 7/0666
See application file for complete search history.

(56) References Cited

U.S. PATENT DOCUMENTS

| | | | | | |
|---|---|---|---|---|---|
| 2,136,122 | A * | 11/1938 | Almdale | B62D 21/00 280/797 |
| 2,297,123 | A * | 9/1942 | Almdale | B62D 21/00 219/94 |
| 3,442,351 | A | 5/1969 | Parrish et al. | |
| 4,175,644 | A | 11/1979 | Sikli | |
| 4,674,770 | A * | 6/1987 | Inagaki | B62D 21/02 280/797 |
| 4,690,250 | A | 9/1987 | Bergstrom | |
| 4,873,861 | A | 10/1989 | Bergstrom | |
| 4,959,991 | A | 10/1990 | Andersson | |

(Continued)

FOREIGN PATENT DOCUMENTS

WO WO-2018139747 A1 * 8/2018 ................ B66F 3/12

OTHER PUBLICATIONS

Car-O-Liner, BenchRack, Instruction Manual, Jan. 2021. See at least p. 48.

(Continued)

*Primary Examiner* — Mahdi H Nejad
(74) *Attorney, Agent, or Firm* — McDonnell Boehnen Hulbert & Berghoff LLP

(57) ABSTRACT

A scissor arm for an articulating support is configured to rotate about an axis of rotation. The scissor arm includes a central support structure at least a portion of which extends in a plane that is perpendicular to the axis of rotation. The scissor arm also includes a tubular body including first and second members that form opposing sides of the scissor arm and are attached to the central support structure. Each of the first and second members of the tubular body includes an outer wall spaced from the plane, an upper flange extending from the outer wall toward the plane, and a lower flange extending from the outer wall toward the plane.

25 Claims, 15 Drawing Sheets

(56) References Cited

U.S. PATENT DOCUMENTS

| | | | | |
|---|---|---|---|---|
| 5,507,522 | A * | 4/1996 | Ritchie | E04C 3/29<br>280/800 |
| 5,636,711 | A * | 6/1997 | Nussbaum | B66F 7/0666<br>187/269 |
| D469,224 | S | 1/2003 | Stenkvist et al. | |
| 6,733,040 | B1 * | 5/2004 | Simboli | B62D 21/09<br>296/187.02 |
| 10,358,330 | B2 | 7/2019 | Anglade | |
| 11,654,975 | B2 * | 5/2023 | Spehar | B62D 27/023<br>296/204 |
| 11,945,702 | B1 * | 4/2024 | Neubauer | B66F 11/042 |
| 2003/0184075 | A1 * | 10/2003 | Freeman | B62D 21/00<br>280/797 |
| 2008/0156960 | A1 * | 7/2008 | Elio | F16M 11/38<br>248/564 |
| 2018/0118539 | A1 * | 5/2018 | Kritzer | B66F 7/065 |
| 2019/0218078 | A1 * | 7/2019 | Tao | B66F 7/28 |
| 2020/0071141 | A1 * | 3/2020 | Kritzer | B66F 7/0683 |

OTHER PUBLICATIONS

Car-O-Liner, Quick 42 UL/CSA Bench Repair System, Instruction Manual, Jan. 2021.
Car-O-Liner, BenchRack 5500/6300, Brochure, Jan. 2008.
Car-O-Liner, Speed3t and Speedplus3t Lifting Platform, Instruction Manual, Feb. 2021.
Car-O-Liner, Scissors lift T5, Instruction Manual, Jun. 1996.
International Search Report and Written Opinion for Int. App. No. PCT/EP2022/076120, mailed Jan. 25, 2023.

* cited by examiner

SCISSOR ARM, SCISSOR LIFT, AND METHOD OF FABRICATING A SCISSOR ARM

BACKGROUND

Articulating support structures can be used to support loads over a broad surface such as a platform. One very effective articulating support structure uses a scissor configuration with scissor arms that support the surface. The scissor arms are typically arranged in groups of at least two that cross in an "X" configuration. By rotating the opposing scissor arms in opposite directions, the scissor structure can be made longer or shorter with respect to the direction of the load. For example, in a scissor lift, rotating the opposing scissor arms in opposite directions will raise or lower the support platform of the lift. In bearing the load that is being supported, the scissor arms are typically exposed to bending stresses, which may be concentrated in certain areas.

In the design of articulating scissor structures there may be a trade-off between the strength of the structure and the weight and material cost of the structure. For example, to reduce the weight of some scissor structures, the scissor arms may be made hollow. However, the hollow construction of the scissor arm may be insufficient to bear the bending stresses at certain locations. To strengthen the scissor arm, a common practice is to weld additional plates placed upon an external surface of the hollow structure of the scissor arm in the areas where the stresses are concentrated. This practice adds material and weight to the scissor arm. Moreover, the process of welding the plates onto the structure is time consuming and therefore costly.

It would be beneficial to have a scissor arm that has a high strength to weight ratio and can be easily fabricated.

Overview

In a first implementation, a scissor arm for an articulating support structure is provided. The scissor arm is configured to rotate about an axis of rotation. The scissor arm includes a central support structure at least a portion of which extends in a plane that is perpendicular to the axis of rotation. The scissor arm also includes a tubular body including first and second members that form opposing sides of the scissor arm and are attached to the central support structure. Each of the first and second members of the tubular body includes an outer wall spaced from the plane, an upper flange extending from the outer wall toward the plane, and a lower flange extending from the outer wall toward the plane.

In a second implementation, a scissor lift is provided. The scissor lift includes a platform and an articulating support structure configured to raise and lower the platform. The articulating support structure includes a group of scissor arms. Each of the scissor arms of the group of scissor arms is rotatable about a pivot member and includes an upper end coupled to the platform. A first scissor arm of the group of scissor arms includes a central support structure, at least a portion of which extends in a plane that is perpendicular to the axis of rotation, and a tubular body. The tubular body includes first and second members that are respectively disposed on opposing sides of the first scissor arm and are attached to the central support structure. Each of the first and second members includes an outer wall spaced from the plane, an upper flange extending from the outer wall toward the plane, and a lower flange extending from the outer wall toward the plane.

In a third implementation, a method of fabricating a scissor arm is provided. The method includes positioning first and second members of a tubular body on opposing sides of a central support structure, at least a portion of which extends in a plane. The first and second members are positioned such that an outer wall of each of the first and second members is spaced from the plane, a first portion of an upper flange of the first member is adjacent to a first side of the central support structure, a first portion of a lower flange of the first member is adjacent to the first side of the central support structure, a first portion of an upper flange of the second member is adjacent to a second side of the central support structure, and a first portion of a lower flange of the second member is adjacent to the second side of the central support structure. The method also includes welding the central support structure to each of the first portion of the upper flange of the first member, the first portion of the lower flange of the first member, the first portion of the upper flange of the second member, and the first portion of lower flange of the second member.

Other implementations will become apparent to those of ordinary skill in the art by reading the following detailed description, with reference where appropriate to the accompanying drawings.

BRIEF DESCRIPTION OF THE DRAWINGS

Example implementations are described herein with reference to the drawings.

Figure 1A:
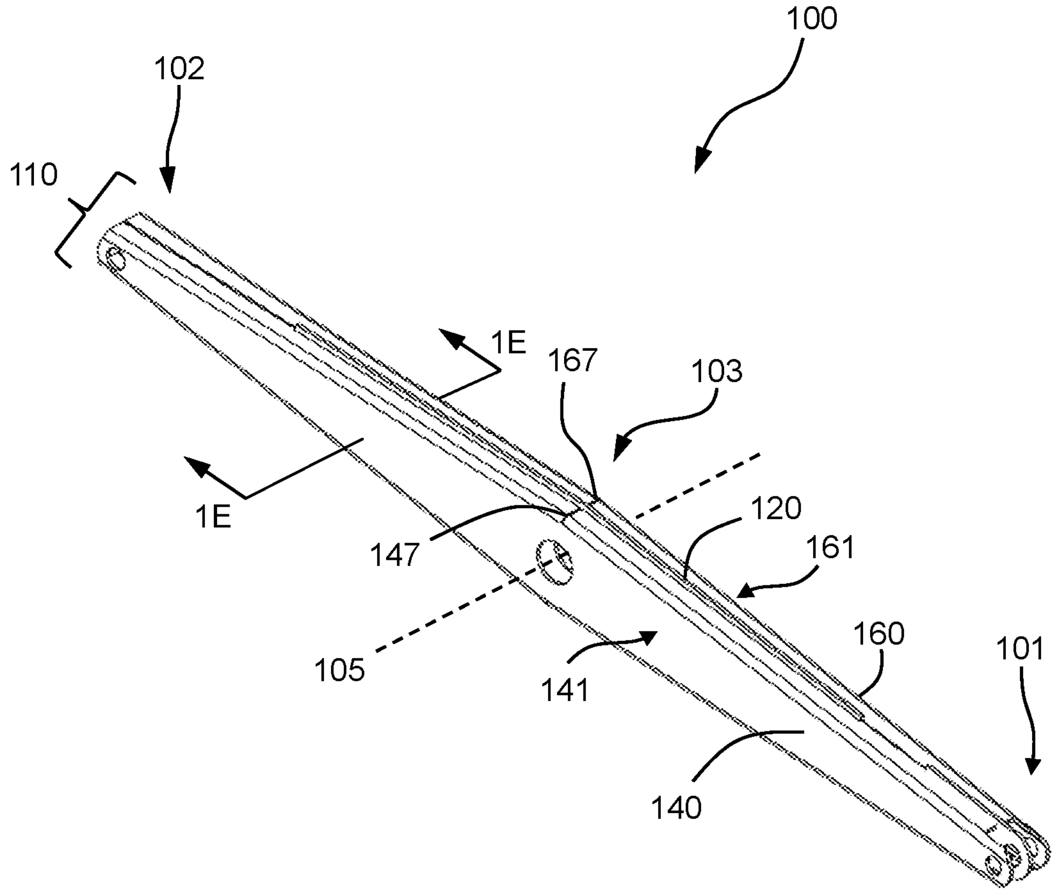
FIG. 1A shows a top perspective view of a scissor arm in accordance with an example implementation.
Figure 1B:
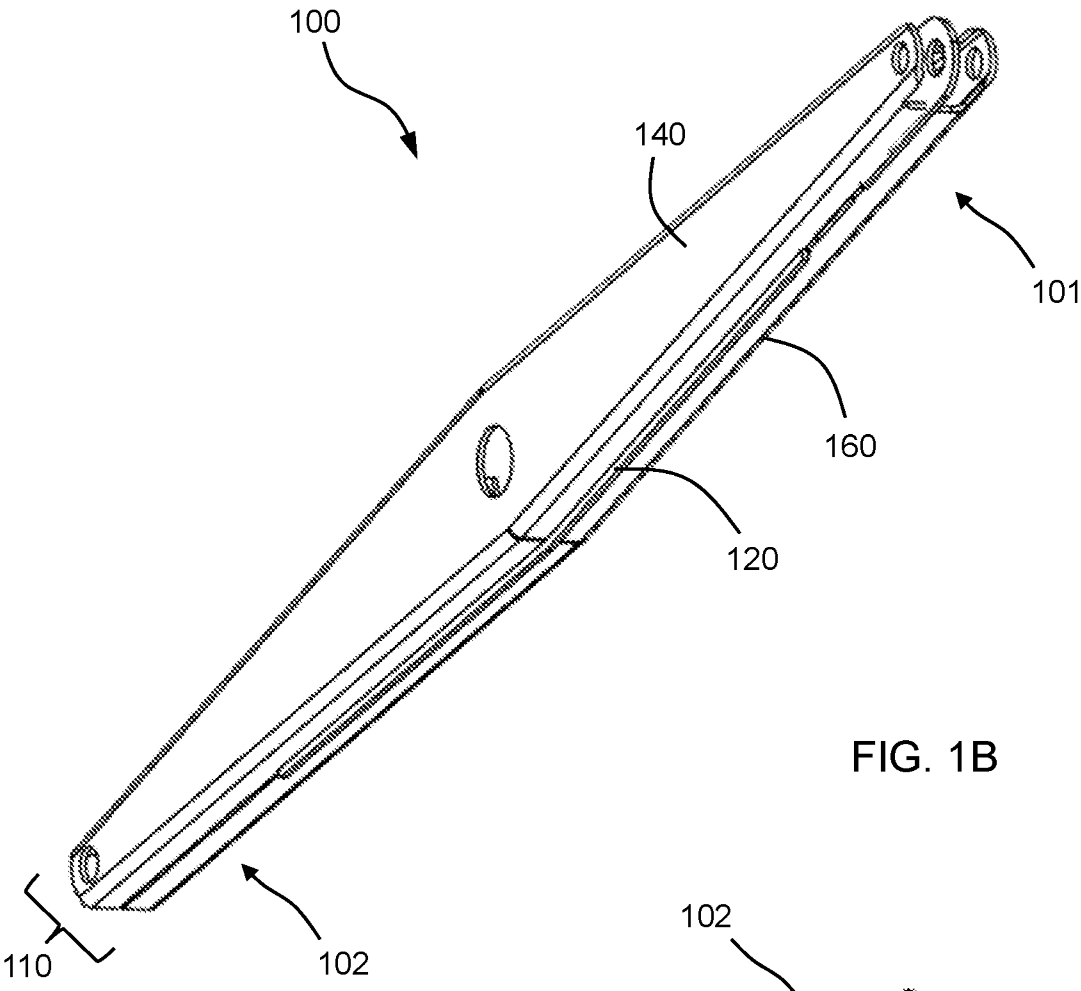
FIG. 1B shows a bottom perspective view of the scissor arm of FIG. 1A.
Figure 1C:
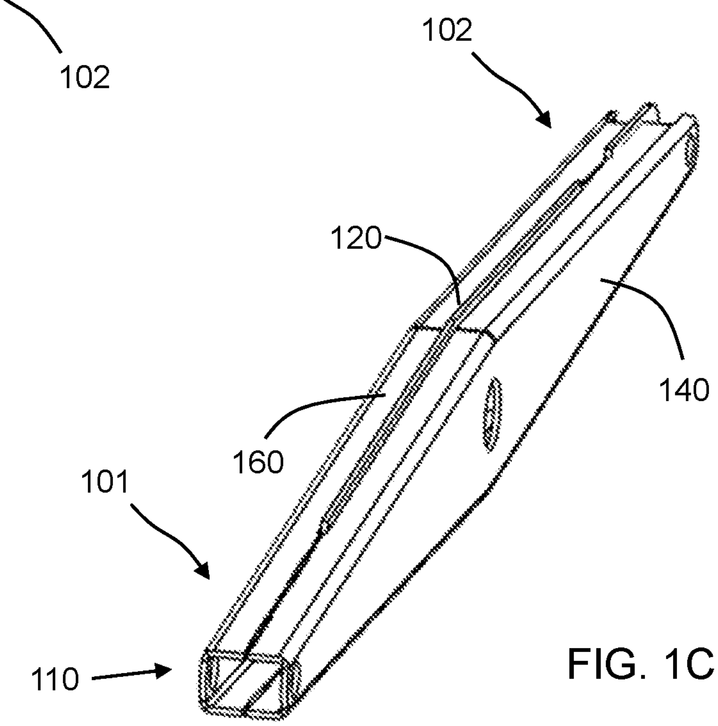
FIG. 1C shows a rear perspective view of the scissor arm of FIG. 1A.

All the figures are schematic and not necessarily to scale.

DETAILED DESCRIPTION

I. Introduction

This description describes several example implementations, at least some of which pertain to scissor arms, scissor lifts that include several scissor arms, or methods of fabricating a scissor arm. The scissor arm(s) can be used in an articulating structure.

In at least some implementations, the scissor arm includes a central support structure at least a portion of which extends along a plane, and a tubular body formed by first and second members each of which includes an outer wall and flanges that extend toward the central support structure. The use of the central support structure as part of the scissor arm configuration increases the overall strength of the scissor arm, which allows the weight of the components to be reduced while meeting performance requirements. Further, the use of the central support structure may avoid the need for at least some reinforcements on the outside of the tubular body. Accordingly, the location of the central support structure may save space compared to other reinforcing structures.

In at least some implementations, the size and position of the central support structure can be adapted to address stresses at particular locations along the length of the scissor arm, thus the added weight afforded by including the central support structure may be used to target specific stresses, rather than unnecessarily adding weight throughout the scissor arm to increase strength. Moreover, in at least some implementations, the materials used for the central support structure and first and second members can be selected to provide greater strength where it is needed for a particular application.

In at least some implementations, the scissor arm may be configured to allow for efficient fabrication. For example, in some implementations, the scissor arm may be constructed from a relatively small number of metal plates. Such metal plates may have consistent and precise dimensions. Accordingly, by precisely cutting and bending the metal plates to form the components of the scissor arm, the dimensions of the scissor arm components can be fabricated within narrow tolerances. This may allow the components to precisely fit together, which can simplify the attachment of the pieces, for example by welding.

The use of the tubular body and central support structure may allow for a strong construction without the need for a substantial number of additional components or supports. Further, in some implementations, the scissor arm may be configured such that it may be welded in a single pass. For example, in some implementations, all of the welds that connect the different components of the scissor arm may be formed while the components are held in a single position within a fixture. By limiting the number of positions needed to weld the components, the overall time needed to fabricate the scissor arm can be reduced, thereby increasing manufacturing efficiency.

II. Example Scissor Arms

FIGS. 1A-1E shows an example implementation of a scissor arm 100 for an articulating support structure that may include a first end 101, a second end 102 and a central pivot 103. The central pivot 103 may be aligned with an axis 105 about which the scissor arm 100 is configured to rotate. For example, the scissor arm 100 may rotate within a plane 104 (see FIG. 1E) about axis 105.

As explained in more detail below, in some example implementations of an articulating support structure that incorporates such a scissor arm 100, the axis 105 may translate as the scissor arm 100 rotates. For instance, in certain implementations, the first end 101 or the second end 102 may be fixed in place such that the scissor arm 100 rotates around the fixed end and the axis 105 associated with the central pivot 103 translates through the plane 104 as the axis 105 moves with the central pivot 103. Further, in some implementations, an entirety of the scissor arm 100 may move through the plane 104 as it rotates. The term central, as used herein, is intended to mean somewhere between opposing ends, sides, faces, etc., and is not intended to mean precisely equidistant from the ends, sides, faces, etc. Thus, it should be understood that the central pivot 103 is positioned between the first end 101 and the second end 102 and may either be located at a midpoint between the first end 101 and the second end 102, or may be closer to one of the first end 101 and the second end 102.

Figure 1D:
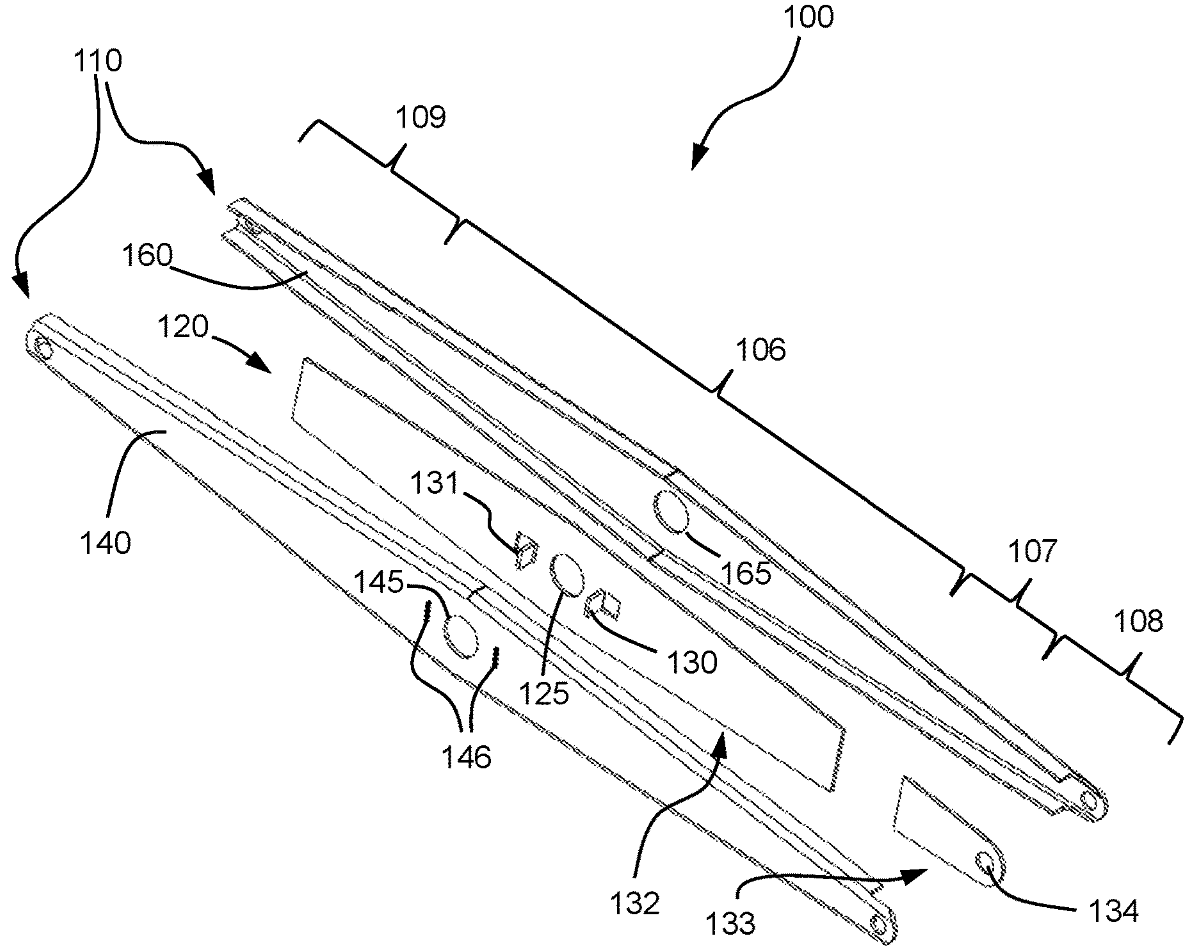
FIG. 1D shows an exploded top perspective view of the scissor arm of FIG. 1A.
Figure 1E:
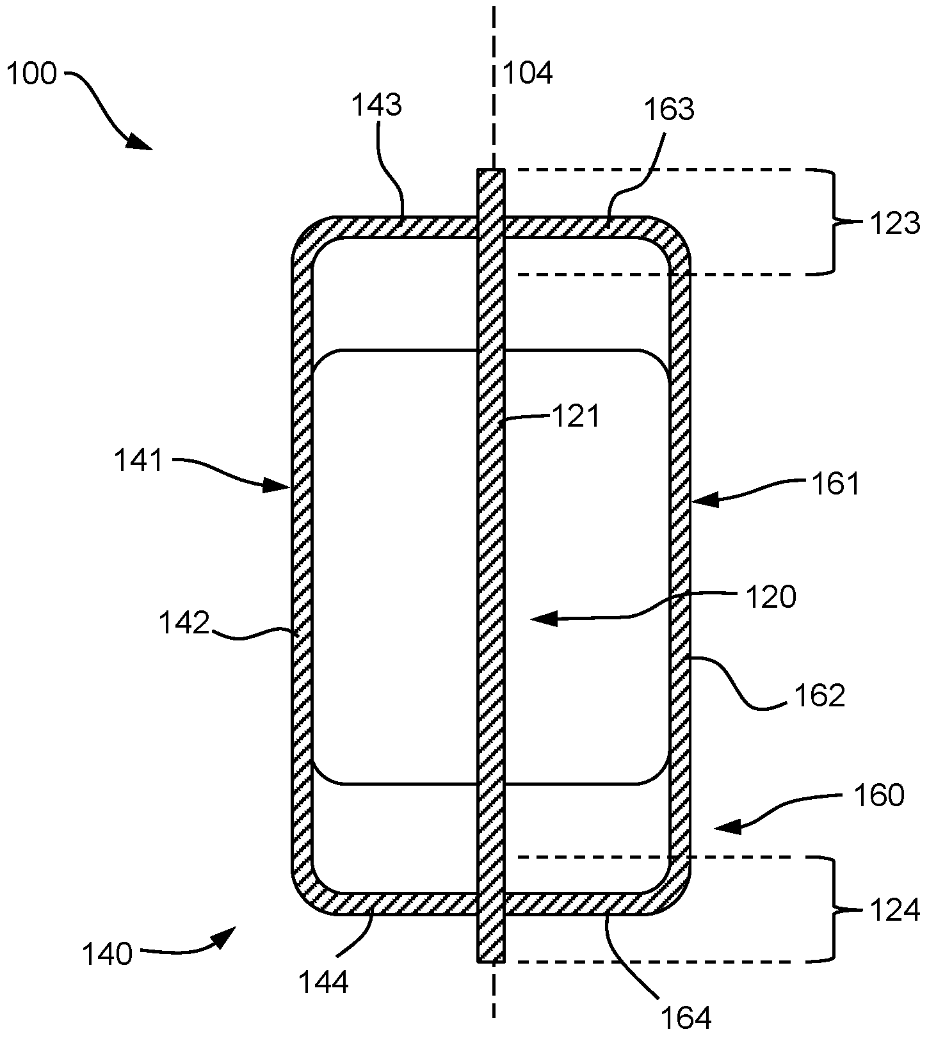
FIG. 1E shows a cross-sectional view of the scissor arm of FIG. 1A, taken along line 1E-1E of FIG. 1A.

As shown more clearly in the exploded view of FIG. 1D, the scissor arm 100 may include a central support structure 120, a first member 140 of a tubular body 110, and a second member 160 of the tubular body 110. As illustrated in FIG. 1E, the central support structure 120 may be aligned with the plane 104 and the first member 140 and second member 160 may be positioned about the central support structure 120 so as to respectively form a first side 141 and a second side 161 of the scissor arm 100. These components may form the scissor arm 100 by attachment of the first member 140 and second member 160 to the central support structure 120.

The central support structure 120 in FIGS. 1A-1E is shown to represent a central support structure generally. Specific examples of a central support structure are described below and shown in other drawings. In other words, unless the context dictates otherwise, the other central support structures can be used within the scissor arm 100.

As explained in more detail below, the first member 140 may include an outer wall 142 that is spaced from the plane 104, an upper flange 143 that extends from the outer wall 142 toward the plane 104, and a lower flange 144 that extends from the outer wall 142 toward the plane 104. Likewise, the second member 160 may also include an outer wall 162 that is spaced from the plane 104, an upper flange 163 that extends from the outer wall 162 toward the plane 104, and a lower flange 164 that extends from the outer wall 162 toward the plane 104.

In some implementations, each of the central support structure 120, first member 140, and second member 160 may include a respective central aperture at the pivot aligned with the axis 105. For example, the central support structure 120 of scissor arm 100 includes a central aperture 125, the first member 140 includes a central aperture 145 and the second member 160 includes a central aperture 165. As explained in more detail below, the central apertures 125, 145, 165 may be configured to receive a pin or similar structure for facilitating rotation of the scissor arm 100 about the axis 105.

In one respect, a center point of the central apertures 125, 145, 165 may located at a midpoint of the central support structure 120, the first member 140, and the second member 160, respectively, longitudinally. In yet another respect, a center point of the central apertures 125, 145, 165 may be located at a midpoint of the central support structure 120, the first member 140, and the second member 160, respectively, with respect to the height of the scissor arm 100. In still yet another respect, a center point of the central apertures 125, 145, 165 is located at a midpoint of the central support structure 120, the first member 140, and the second member 160, respectively, longitudinally and with respect to height.

Moreover, in at least some implementations, one or more of the central apertures 125, 145, 165 may be offset from the longitudinal midpoint and/or the midpoint with respect to height of the central support structure 120, the first member 140, and the second member 160, respectively.

A. Central Support Structure

In the example implementations, the central support structure may have a variety of different configurations. In some implementations, the central support structure may include one or more plates that extend along the plane, such as a first plate and, in some implementations, additional plate(s). For instance, the plate(s) of the central support structure may have sections that are parallel to the plane or that are at least partially disposed in the plane. In other implementations the central support structure may not include any plates. For example, in some implementations the central support structure may be formed by a frame that includes a plurality of frame members, such as rods or beams, rather than including any plates. In still further implementations, the central support structure may include one or more plates and one or more frame members.

In some implementations, the central support structure may include a first plate that is at least partially disposed in the plane. The phrase 'disposed in the plane' as used herein means intersecting a plane and substantially extending along a direction of the plane. For example, as shown in FIG. 1E, the central support structure 120 of scissor arm 100 includes a first plate 121 that is disposed in plane 104.

In some implementations, the first plate 121 of the central support structure 120 may be planar and substantially extend along the plane 104. For example, as shown in the cross-sectional view of FIG. 1E, the first plate 121 is aligned with plane 104. The planar configuration of the first plate 121 may be formed by a flat plate, such as the first plate 121 shown in FIGS. 1A-1E, or may be formed by a plate that substantially extends in a single plane but may have a pattern or texture, such as a corrugated or stamped plate.

Figure 2A:
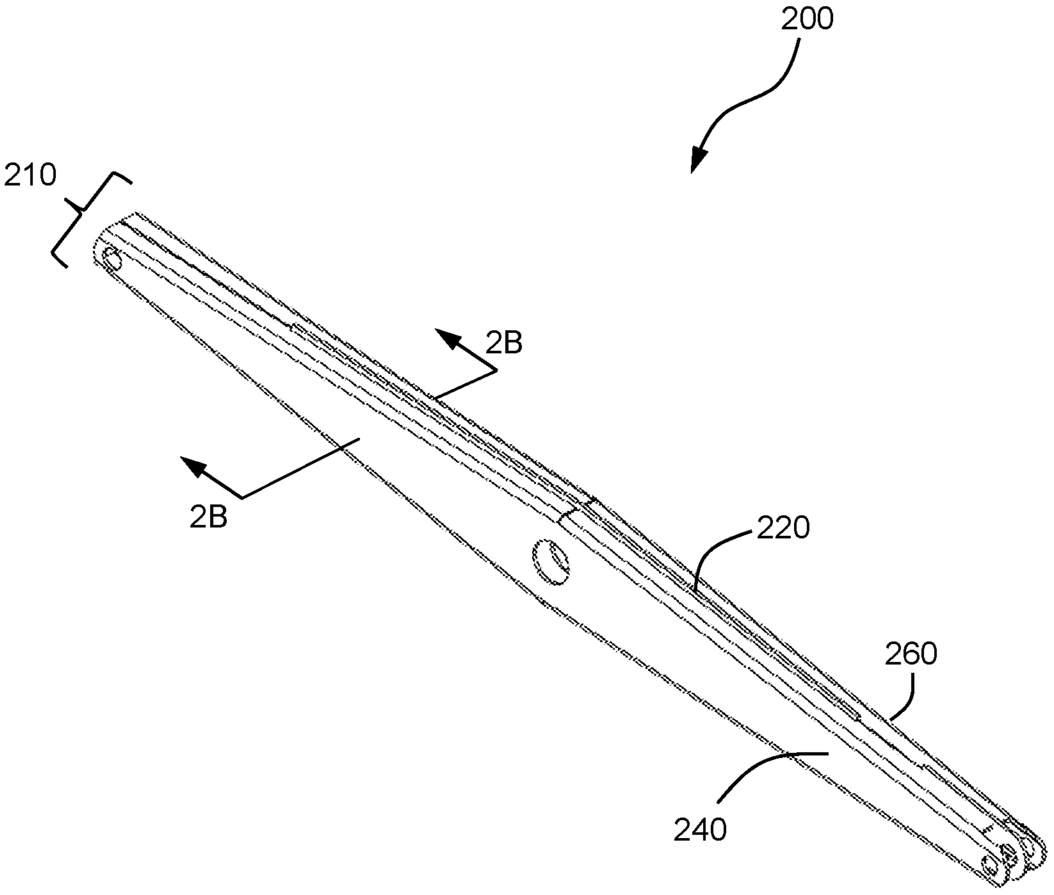
FIG. 2A shows a top perspective view of a scissor arm in accordance with an example implementation.
Figure 2B:
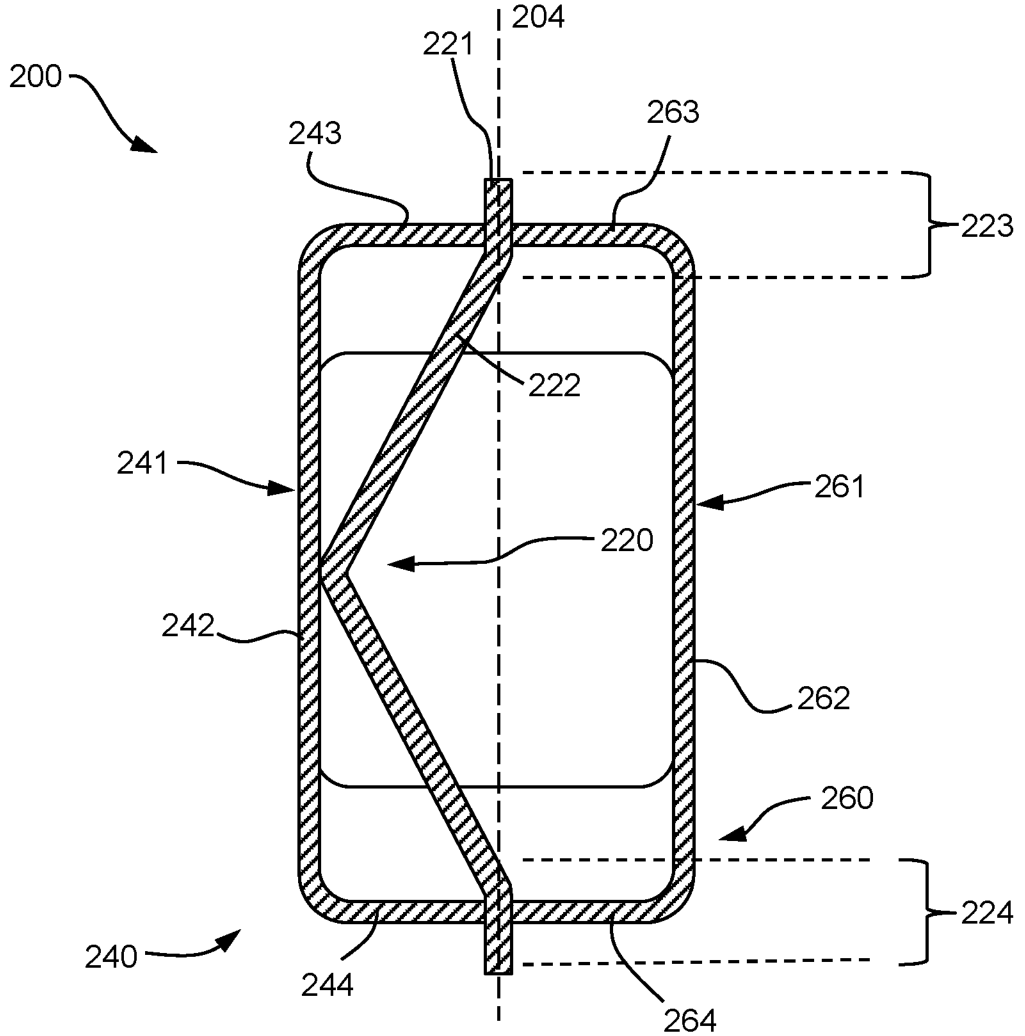
FIG. 2B shows a cross-sectional view of the scissor arm of FIG. 2A, taken along line 2B-2B of FIG. 2A.

In other implementations, the first plate of the central support structure may have a bent profile. A scissor arm having such a central support structure is shown in FIGS. 2A and 2B. FIG. 2A shows a perspective view of scissor arm 200 and FIG. 2B shows a cross-sectional view of scissor arm 200 taken along line 2B-2B. The scissor arm 200 shown in FIGS. 2A and 2B includes a central support structure 220, a first member 240 of a tubular body 210, and a second member 260 of the tubular body 210. The first member 240 and second member 260 have a similar configuration to those of scissor arm 200, shown in FIGS. 1A-1E. Specifically, the first member 240 includes an outer wall 242 that forms a first side 241 of the scissor arm 200 and the second member 260 also includes an outer wall 262 that forms a second side 261 of the scissor arm 200. The first member 240 includes an upper flange 243 and a lower flange 244 that both extend from the outer wall 242 toward the central support structure 220. Similarly, the second member 260 also includes an upper flange 263 and a lower flange 264 that both extend from the outer wall 262 toward the central support structure 220. As shown in FIG. 2B, the central support structure 220 includes a first plate 221 that has a bent profile with respect to the cross section of the scissor arm 200. In particular, the first plate 221 may be bent so as to include a lateral extension 222 positioned between an upper plate section 223 and a lower plate section 224. As illustrated in FIG. 2B, the lateral extension 222 may extend from the upper plate section 223 to the lower plate section 224. Further, the lateral extension 222 may project from the plane of the upper plate section 223 and lower plate section 224 toward the outer wall 242 of first member 240. It should be understood, that the "first" member of the tubular body of the scissor arm may be positioned on either side of the scissor arm.

The upper plate section 223 and the lower plate section 224 of the first plate 221 of the scissor arm 200 may be parallel to one another, and both the upper plate section 223 and the lower plate section 224 may be disposed in the plane 204. Moreover, the upper plate section 223 may be positioned between the upper flange 243 of the first member 240 and the upper flange 263 of the second member 260. Likewise, the lower plate section 224 may be positioned between the lower flange 244 of the first member 240 and the lower flange 264 of the second member 260. The description of the upper and lower plate sections as being between respective flanges of the first and second members refers to at least a portion of the upper and lower plate sections as separating and being interposed between adjacent areas of the respective flanges. However, this description is not intended to preclude the possibility of portions of the upper and lower flanges of the two members extending around or through the first plate in other areas.

It should be understood, that while the upper plate section 223 and lower plate section 224 of the first plate 221 shown in FIG. 2B are delimited by the bends in first plate 221, a planar or flat configuration of the first plate may also include such plates sections. For instance, as shown in FIG. 1E, the first plate 121 of the central support structure 120 of the scissor arm 100 also includes such upper and lower plate sections. In particular, the first plate 121 of scissor arm 100 includes an upper plate section 123 that may be positioned between the upper flange 143 of the first member 140 and the upper flange 163 of the second member 160, and a lower plate section 124 that may be positioned between the lower flange 144 of the first member 140 and the lower flange 164 of the second member 160.

Figure 3A:
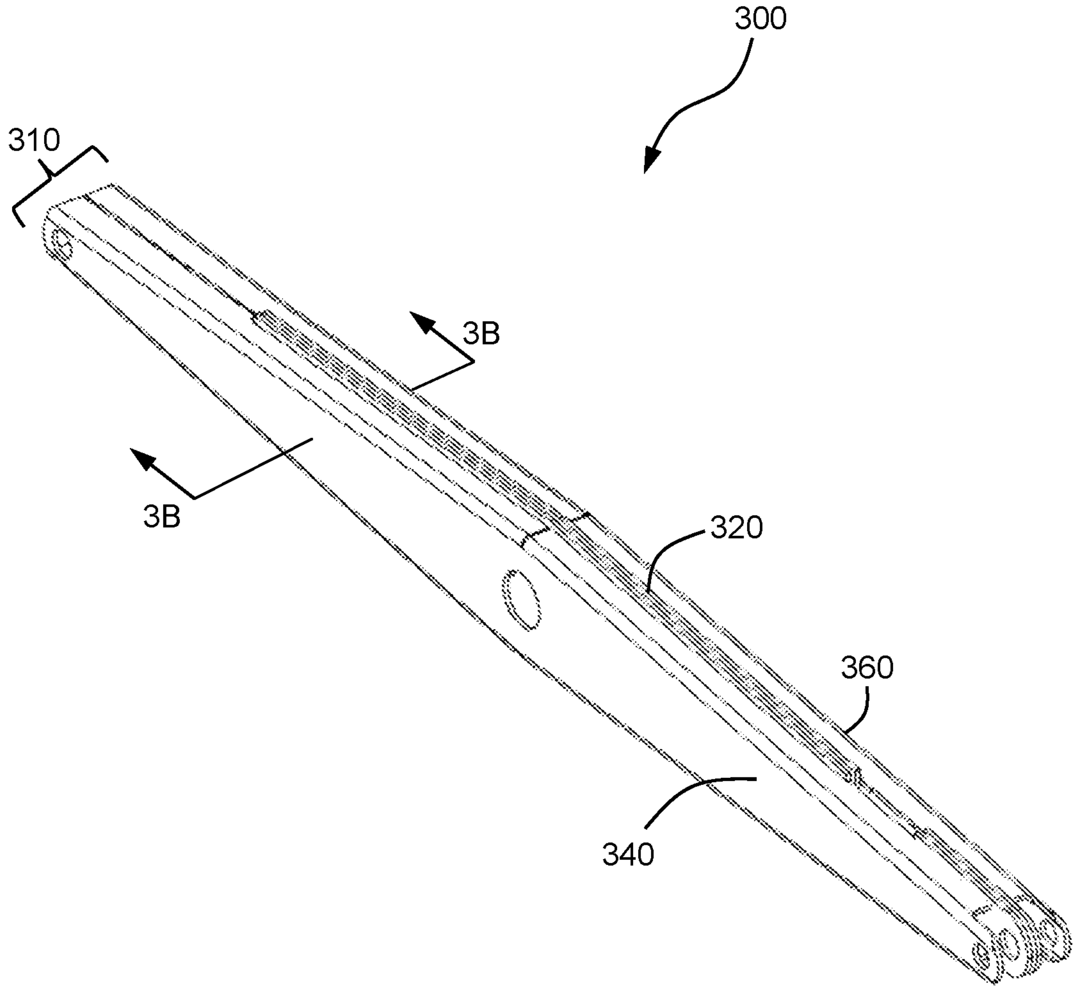
FIG. 3A shows a top perspective view of a scissor arm in accordance with an example implementation.
Figure 3B:
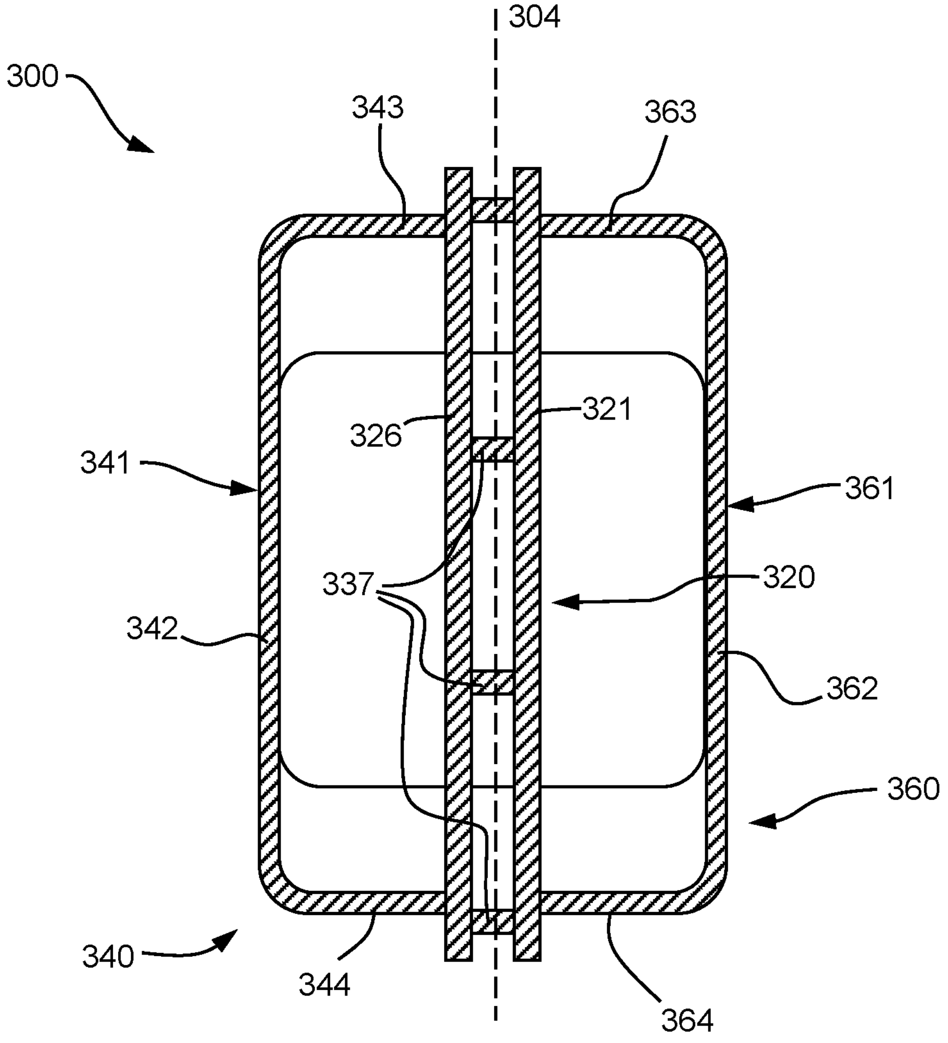
FIG. 3B shows a cross-sectional view of the scissor arm of FIG. 3A taken along line 3B-3B of FIG. 3A.

In some implementations, the central support structure may include a second plate that overlaps the first plate along the length of the scissor arm. A scissor arm having such a central support structure is shown in FIGS. 3A and 3B. FIG. 3A shows a perspective view of scissor arm 300 and FIG. 3B shows a cross-sectional view of scissor arm 300 taken along line 3B-3B. The scissor arm 300 includes a central support structure 320 extending in a plane 304, and a tubular body 310 with a first member 340, and a second member 360. The first member 340 includes an outer wall 342 that forms a first side 341 of the scissor arm 300 and the second member 360 also includes an outer wall 362 that forms a second side 361 of the scissor arm 300. The first member 340 includes an upper flange 343 and a lower flange 344 that both extend from the outer wall 342 toward the central support structure 320. Similarly, the second member 360 also includes an upper flange 363 and a lower flange 364 that both extend from the respective outer wall 362 toward the central support structure 320. As shown more clearly in FIG. 3B, the central support structure 320 includes a first plate 321 and a second plate 326 that overlap along the length of the scissor arm 300. In other words, the first plate 321 and the second plate 326 both intersect at least one cross section along the length of the scissor arm 300 so as to overlap across the width of the scissor arm 300, such as is shown in FIG. 3B.

Figure 4A:
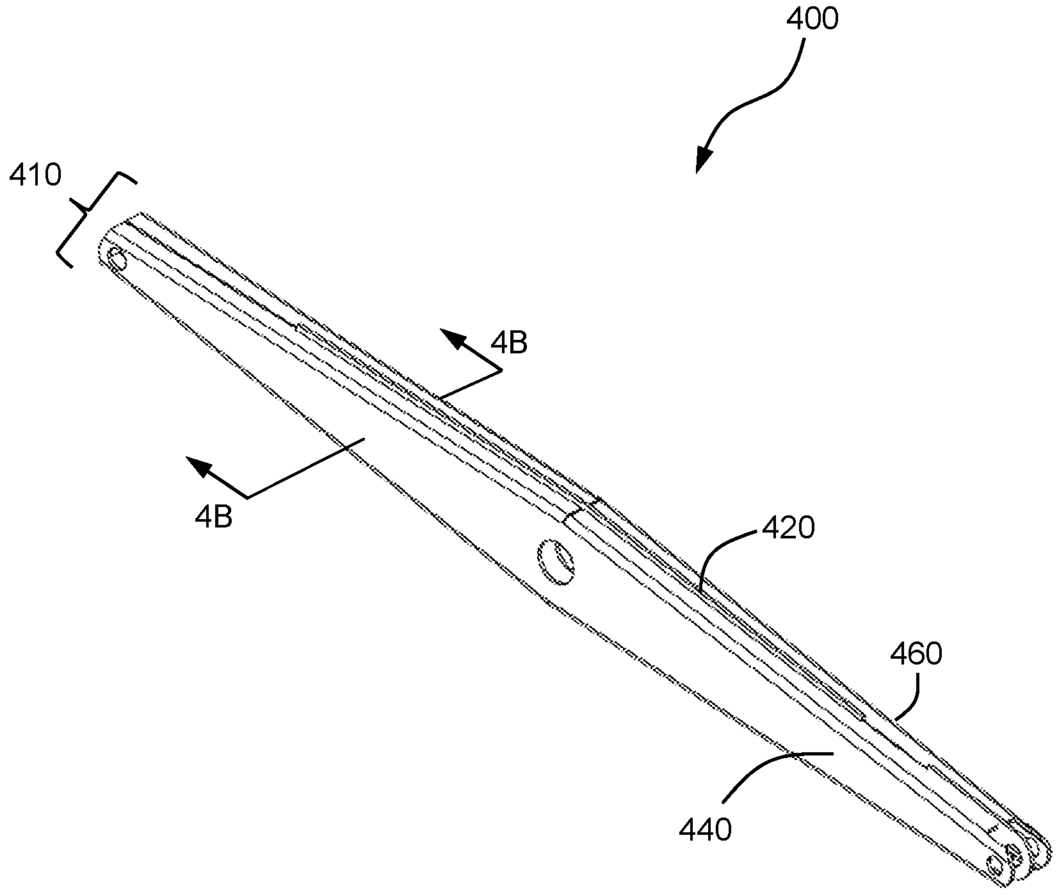
FIG. 4A shows a top perspective view of a scissor arm in accordance with an example implementation.
Figure 4B:
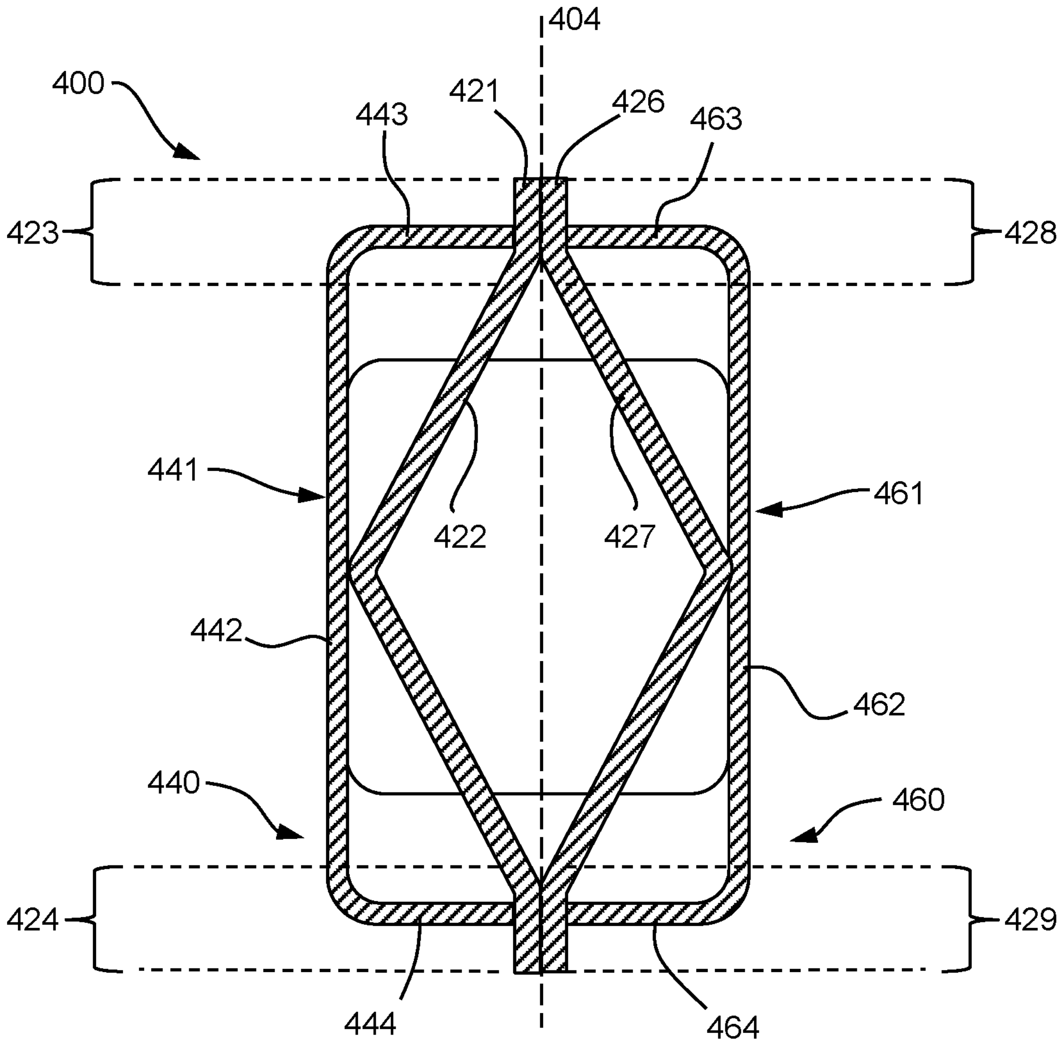
FIG. 4B shows a cross-sectional view of the scissor arm of FIG. 4A taken along line 4B-4B of FIG. 4A.

FIGS. 4A and 4B show another implementation of a scissor arm 400 including a central support structure 420 with a second plate 426. FIG. 4A shows a perspective view of scissor arm 400 and FIG. 4B shows a cross-sectional view of scissor arm 400 taken along line 4B-4B. Scissor arm 400 includes the central support structure 420 extending in a plane 404, and a tubular body 410 with a first member 440, and a second member 460. The first member 440 includes an outer wall 442 that forms a first side 441 of the scissor arm 400 and the second member 460 also includes an outer wall 462 that forms a second side 461 of the scissor arm 400. The first member 440 includes an upper flange 443 and a lower flange 444 that both extend from the outer wall 442 toward the central support structure 420 and the second member 460 also includes an upper flange 463 and a lower flange 464 that both extend from the outer wall 462 toward the central support structure 420. The central support structure 420 includes a first plate 421 and a second plate 426 that overlap along the length of the scissor arm 400.

In some implementations the second plate may be planar. For example, in scissor arm 300, shown in FIGS. 3A and 3B, the first plate 321 and the second plate 326 are both flat plates that are parallel to one another.

In other implementations the second plate may have a bent profile. For example, in scissor arm 400, shown in FIGS. 4A and 4B, the first plate 421 includes a bent profile and the second plate 426 also includes a bent profile. Specifically, the first plate 421 includes an upper plate section 423, a lower plate section 424 and a lateral extension 422 between the upper plate section 423 and lower plate section 424. Likewise, the second plate 426 includes an upper plate section 428, a lower plate section 429, and a lateral extension 427 between the upper plate section 428 and lower plate section 429. As illustrated in FIG. 4B, the lateral extension 422 of first plate 421 may extend from the upper plate section 423 to lower plate section 424 and the lateral extension 427 of the second plate 426 may extend from the upper plate section 428 to lower plate section 429. Further, the lateral extension 422 of the first plate 421 may extend to the outer wall 442 of the first member 440 or it may be spaced from the outer wall 442, and the lateral extension 427 of the second plate 426 may extend to the outer wall 462 of the second member 460 or it may be spaced from the outer wall 462. The cross section of the central support structure 420 may be consistent along its length. For example, the cross section of the central support structure 420 shown in FIG. 4B may extend along the entire length of thereof. For example, the first plate 421 and second plate 426 may be bent along lines that extend over the length of the central support structure 420 to form the respective plate sections and lateral extensions. In other embodiments, the central support structure may have a more complicated construction and vary over the length thereof.

In some implementations, the first and second plates may both have a bent profile. For example, the first plate 421 and the second plate 426 both have bent profiles with mirror image configurations. In other implementations, the profiles of the plates may be different. Moreover, in some implementations, the first plate may be planar while the second plate has a bent profile. Likewise, in other implementations the second plate may be planar while the first plate has a bent profile.

In some implementations, the central support structure includes plates that are separated by one or more spacers. For example, in scissor arm 300, first plate 321 and second plate 326 are separated by a plurality of spacers 337 that couple the first plate 321 and second plate 326 together.

While all of the cross sections shown in FIGS. 1E to 4B include central support structures with one or two plates, the central support structure may include additional plates. For example, in some implementations the central support structure may include a stack of plates that are connected to one another by spacers, a frame, connecting rods, or other attachments.

In some implementations, as shown in scissor arm 100 in FIG. 1D, the central support structure may include a first reinforcing tab 130 extending from the first plate 121 to the outer wall 142 of the first member 140 of the tubular body 110. The first reinforcing tab 130 may be formed by a bent cutout of the first plate 121, and the length of the cutout may be configured to at least reach the outer wall 142 of the first member 140. In some implementations the first reinforcing tab 130 may be attached to the outer wall 142 of the first member 140. For example, as shown in FIG. 1D, the outer wall 142 of the first member 140 may include a slot 146 for receiving the first reinforcing tab 130. The first reinforcing tab 130 may then be attached to the outer wall 142 from the outer surface of the scissor arm 100, for example by plug welding. Alternatively, the first reinforcing tab 130 may extend through the slot 146 and be folded over the outer wall 142 and attached thereto by welding or using a fastener. By securing the first reinforcing tab 130 to the outer wall 142 of the first member 140, the strength of the scissor arm may be increased and the scissor arm may be more resistant to buckling or twisting.

In other implementations, the first reinforcing tab 130 may abut the outer wall 142 of the first member 140 of the tubular body 110 without being attached to the outer wall 142. In such implementations, the first reinforcing tab 130 may improve the strength of the scissor arm by providing a brace for the outer wall 142 of the first member 140.

In some implementations, the first reinforcing tab may be located in a vicinity of the central pivot 103 of the scissor arm 100. Utilizing the additional strength provided by the first reinforcing tab near the central pivot 103 can help counter loads in this area, where stresses may be high. For example, in some implementations, the distance between the first reinforcing tab 130 and a central aperture 125 of the central support structure 120 may be no more than 10% of the length of the scissor arm. In other implementations, the distance between the first reinforcing tab 130 and the central aperture 125 may be greater. For example, in some implementations, the first reinforcing tab 130 may be positioned closer to an end of the scissor arm 100.

In some implementations, the central support structure 120 may include a second reinforcing tab 131 spaced from the first reinforcing tab 130 and extending to the outer wall of the first member. The first reinforcing tab 130 and the second reinforcing tab 131 may be positioned on opposite sides of the central aperture 125 so as to balance any loads that are exerted on the reinforcing tabs.

Figure 5:
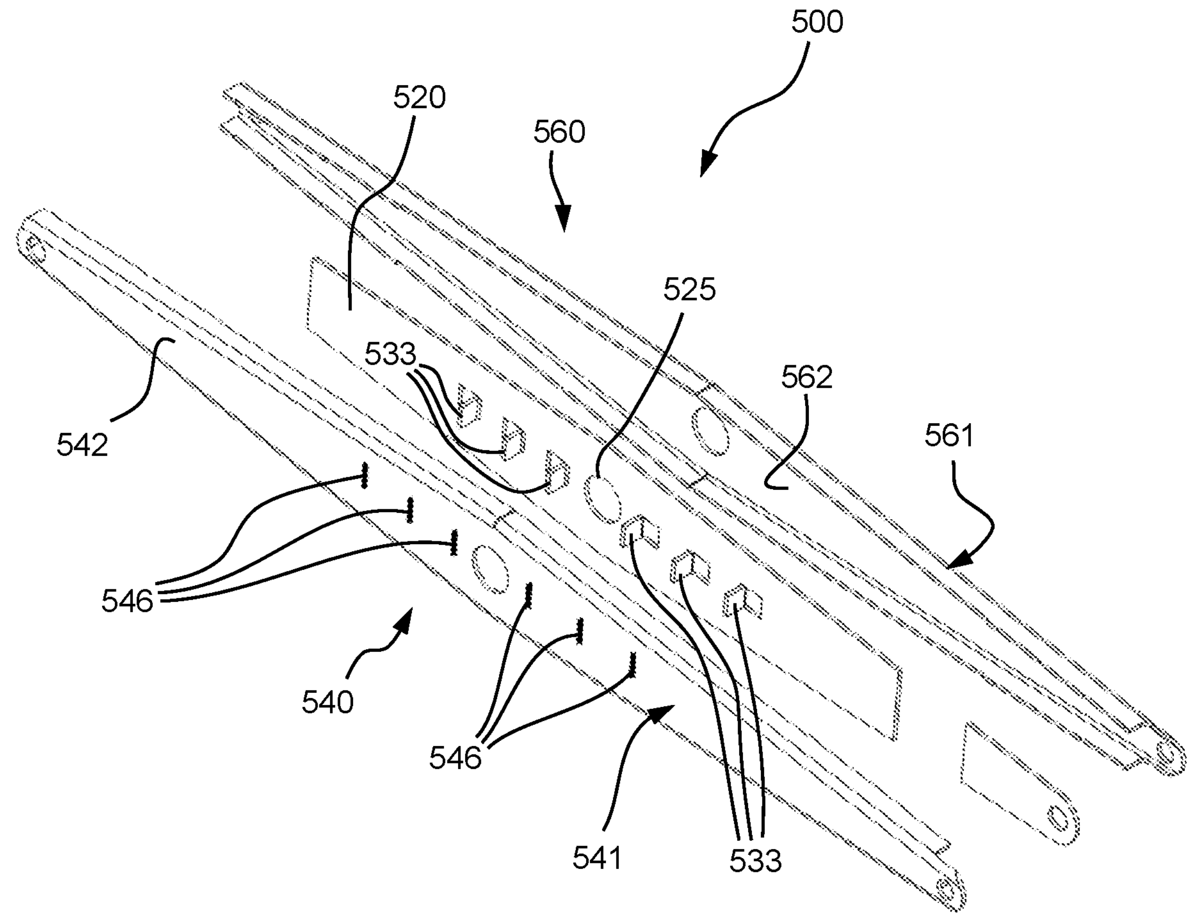
FIG. 5 shows an exploded top perspective view of a scissor arm in accordance with another example implementation.

Further, in some implementations, the first reinforcing tab is one of a plurality of tabs positioned along the length of the scissor arm. FIG. 5 shows an exploded view of such a scissor arm. The scissor arm 500 shown in FIG. 5 includes a central support structure 520, a first member 540, and a second member 560. The first member 540 includes an outer wall 542 that forms a first side 541 of the scissor arm 500 and the second member 560 also includes an outer wall 562 that forms a second side 561 of the scissor arm 500. The central support structure 520 includes a first plate 521 and may include a plurality of reinforcing tabs 533 extending outward toward the outer wall 542 of the first member 540. The plurality of reinforcing tabs 533 may be positioned on both sides of a central aperture 525, as shown in FIG. 5, or may be concentrated on one side of the central aperture 525. Further, the reinforcing tabs 533 may be in a row, as in FIG. 5, or may be located at various positions over the height of the scissor arm 500.

In some implementations the reinforcing tabs 533 may be attached to the outer wall 542 of the first member 540. For example, as shown in FIG. 5, the outer wall 542 of the first member 540 may include respective slots 546 for receiving the reinforcing tabs 533. The reinforcing tabs 533 may then be attached to the outer wall 542 from the outer surface of the scissor arm 500, for example by plug welding. By securing the reinforcing tabs 533 to the outer wall 542 of the first member 540, the strength of the scissor arm may be increased and the scissor arm may be more resistant to buckling or twisting.

While all of the reinforcing tabs shown in scissor arm 100, as in FIGS. 1D and 1*n* scissor arm 500, as in FIG. 5 are shown extending toward the outer wall of the first member of the respective tubular body, in some implementations, the central support structure may include one or more opposing reinforcing tab that extends toward the outer wall of the second member of the tubular body. The opposing tab(s) may extend from the first plate, similar to the reinforcing tabs described with respect to the implementations shown in FIGS. 1D and 5 or may extend from a second plate of the central reinforcing structure.

While each of the reinforcing tabs in scissor arm 100 (FIG. 1D) and in scissor arm 500 (FIG. 5) are oriented to extend along the height of the scissor arm, it is also possible for the reinforcing tabs to be oriented to extend along the length of the scissor arm, or to be disposed at an angle to the length direction of the scissor arm.

In some implementations, the central support structure may include one or more sections that extends along the length of the tubular body. The sections may extend over different portions of the scissor arm along its length. For example, in some implementations, the central support structure may include only a first section that extends over the entire length of the scissor arm or over a portion of the length of the scissor arm. In other implementations, the central support structure may include more than one section, and each section may extend over a different portion of the length of the scissor arm.

For example, as shown in FIG. 1D, the central support structure 120 of the scissor arm 100 may include a first section 132 that extends over a first portion 106 of the length of the tubular body 110. The first section 132 may be disposed near the middle of the scissor arm 100 so as to surround the central pivot 103, thereby providing additional strength to the scissor arm 100 around the central pivot 103 where stresses may be concentrated. While the first section 132 of the central support structure 120 of scissor arm 100 that is shown in FIGS. 1A-1E is formed by a single plate (i.e., a first plate 121), in other implementations, the first section of the central support structure may be formed by more than one plate, as explained above, or by another structure. Moreover, while the first section 132 shown in FIGS. 1A and 1D is positioned in the middle of the scissor arm, in other implementations, the first section of the central support structure may be positioned near an end of the scissor arm.

At least a portion of the first section 132 of the central support structure 120 may be positioned between the first member 140 of the tubular body 110 and the second member 160 of the tubular body 110. In other words, as explained above, at least a portion of the first section 132 may be interposed between and separating the first member 140 and second member 160 in at least some areas. On the other hand, as explained in more detail below, some portions of the members of the tubular body 110 may extend around or through the first section 132 of the central support structure 120.

For example, in some implementations, as shown in FIGS. 1A-1C and 1E, the upper flange 143 of the first member 140 and the upper flange 163 of the second member 160 may come together along a second portion 107 of the length of the scissor arm 100. Thus, along the first portion 106 of the length of the scissor arm 100, the first member 140 and the second member 160 may be separated by the first section 132 of the central support structure 120, whereas along the second portion 107 of the length of the scissor arm 100 parts of the first member 140 and the second member 160 may extend around the first section 132 and meet one another. Accordingly, some areas of the first member 140 and second member 160 may be attached to the central support structure 120 while other areas are directly connected to one another.

For example, the upper flange 143 of the first member 140 of the tubular body 110 may be connected to the upper flange 163 of the second member 160 of the tubular body 110 along the second portion 107 of the length of the scissor arm 100. Likewise, the lower flange 144 of the first member 140 of the tubular body 110 may be connected to the lower flange 164 of the second member 160 of the tubular body 110 along the second length of the scissor arm 100. Such connections may be made by welding, or another attachment method. In some implementations the length along which the upper flanges are separated by the central support structure is the same as the length along which the lower flanges are separated by the central support structure. In other embodiments, these lengths may be different.

In some implementations, such as in scissor arm 100 as shown in FIGS. 1A and 1D, the central support structure 120 may include a second section 133 that extends over a third portion 108 of the length of the scissor arm 100. The second section 133 may be positioned at a first end of the tubular body 110 and include an aperture 134 configured to receive a pivot member. Accordingly, the second section 133 of the central support structure 120 may provide additional strength to the scissor arm 100 in the vicinity of the connection of the scissor arm to the pivot member. While the second section 133 of the central support structure 120 of the scissor arm 100 that is shown in FIGS. 1A-1E is formed by a single plate, in other implementations, the second section of the central support structure may be formed by more than one plate or by another structure.

The members of the tubular body may also be directly connected over other portions along the length of the scissor arm. For example, the first member 140 and the second member 160 of the tubular body 110 shown in FIGS. 1A and 1D are directly connected over a fourth portion 109 along the length of the scissor arm 100. In particular, the upper flange 143 of the first member 140 of the tubular body 110 may be connected to the upper flange 163 of the second member 160 of the tubular body 110 along the fourth portion 109 of the length of the scissor arm 100, and the lower flange 144 of the first member 140 of the tubular body 110 may also be connected to the lower flange 164 of the second member 160 of the tubular body 110 along the fourth portion 109 of the length of the scissor arm 100

Furthermore, although the implementation shown in FIGS. 1A-1E includes two sections (i.e., a first section 132, and a second section 133) of the central support structure 120 along the length of the scissor arm 100, other implementations may include more or fewer sections. Likewise, the members of the tubular body may be connected to one another in discrete areas along a plurality of different portions of the length of the scissor arm.

Figure 6A:
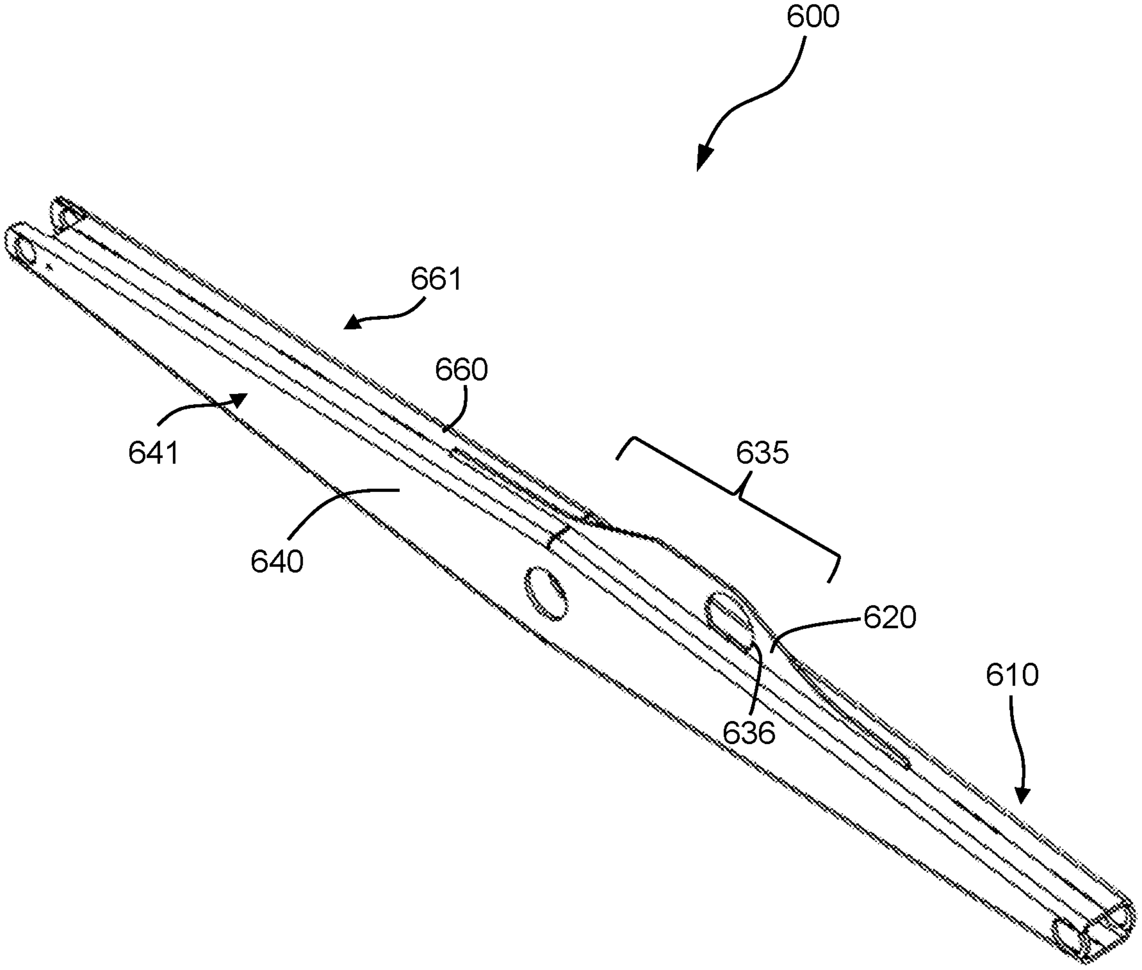
FIG. 6A shows a top perspective view of a scissor arm in accordance with another example implementation.

In some implementations, part of the central support structure may extend outward from the tubular body so as to form a projection. Such an implementation is shown in FIG. 6A. The scissor arm 600 shown in FIG. 6A includes a central support structure 620 and a tubular body 610 formed by a first member 640 and a second member 660. As illustrated, the edges of the central support structure 620 may extend slightly past the flanges of the first member 640 and second member 660 to facilitate welding of these flanges to the central support structure. (The scissor arm 100 may have a similar configuration, as shown in FIG. 1A.) Furthermore, part of the central support structure 620 may extend outward from the tubular body 610 so as to form a projection 635. The projection 635 may be utilized to connect the scissor arm 600 to another structure. For example, the projection 635 may include an aperture 636 for securing the scissor arm 600 to an actuator in certain implementations of an articulating support structure that uses the scissor arm, as explained in further detail below.

The projection 635 may extend outward from an upper or lower side of the tubular body 610, as shown in the implementation depicted in FIG. 6A. In other implementations, the projection may extend outward from an end of the tubular body. Further, while the implementation shown in FIG. 6A includes a single outward projection 635 of the central support structure 620, in other implementations, the central support structure may include more than one projection extending outward from the same or different sides of the tubular body.

B. Tubular Body

As illustrated in FIGS. 1A-1E, the tubular body 110 of the scissor arm 100 may be formed from a first member 140 and a second member 160 that respectively form a first side 141 and opposing second side 161 of the scissor arm 100. The first member 140 may include an outer wall 142 and upper and lower flanges 143, 144 that extend inward from the outer wall toward the central support structure 120. Likewise, the second member 160 may similarly include an outer wall 162, an upper flange 163, and a lower flange 164. While the outer wall and flanges of the first and second members depicted in the drawings are clearly delimited by corners, in other embodiments, the first and second members may be more rounded such that there is no distinct corner between the outer wall and the flanges. Nonetheless, the first and second members may include a section that is spaced from the central support structure and forms the outer wall and sections that extend toward the central support structure and form the upper and lower flanges.

In some implementations, the outer wall 142 of the first member 140 may be spaced from the central support structure 120 by the same distance as the outer wall 162 of the second member 160. In other words, the distance between the outer wall 142 of the first member 140 and the central support structure 120 may be the same as the distance between the outer wall 162 of the second member 160 and the central support structure 120. For example, the upper flange 143 and the lower flange 144 of the first member 140 may be sized to hold the outer wall 142 at a predetermined distance from the central support structure 120, and the upper flange 163 and the lower flange 164 of the second member 160 may be sized to hold the outer wall 162 at the same distance from the central support structure 120. Accordingly, the scissor arm 100 may have a substantially symmetrical configuration, with the central support structure 120 positioned midway between the first side 141 and the second side 161 of the scissor arm.

In other implementations, however, the scissor arm may be asymmetrical, such that the outer wall of the first member is spaced from the central support structure by a different distance than the outer wall of the second member. In other words, the distance between the outer wall of the first member and the central support structure may be different than the distance between the outer wall of the second member and the central support structure. A scissor arm with such an asymmetrical construction may be advantageous when paired with other scissor arms having a mirror-image construction. For example, these configurations may be beneficial for addressing certain twisting or bending loads.

In some implementations, at least a portion of the upper flange 143 of the first member 140 may be connected to the upper flange 163 of the second member 160 at the plane 104, as shown in FIG. 1A, for instance along the second portion 107 of the length of the scissor arm 100. For example, the upper flange 143 of the first member 140 and the upper flange 163 of the second member 160 may project slightly further inward along the second portion 107 than along the first portion 106 such that the upper flanges 143, 163 meet one another at the plane 104 along the second portion 107. Likewise, at least a portion of the lower flange 144 of the first member 140 may be similarly connected to the lower flange 164 of the second member 160 along the plane 104. Some portions of the flanges may be separated by the central support structure 120, as explained above. Further, some portions of the flanges may be separated by a gap, or may be connected to one another at a position that is offset form the plane. For example, the flanges may include projections and indentations along its edge so that the corresponding flanges nest together. For instance, the opposing edges of the upper flanges 143, 163 and/or lower flanges 144, 164 of the first member 140 and second member 160 may fit together to form a square wave along the connected edge. Accordingly, the upper flanges 143, 163 and/or lower flanges 144, 164 may be connected in segments on opposing sides of the plane 104.

Figure 6B:
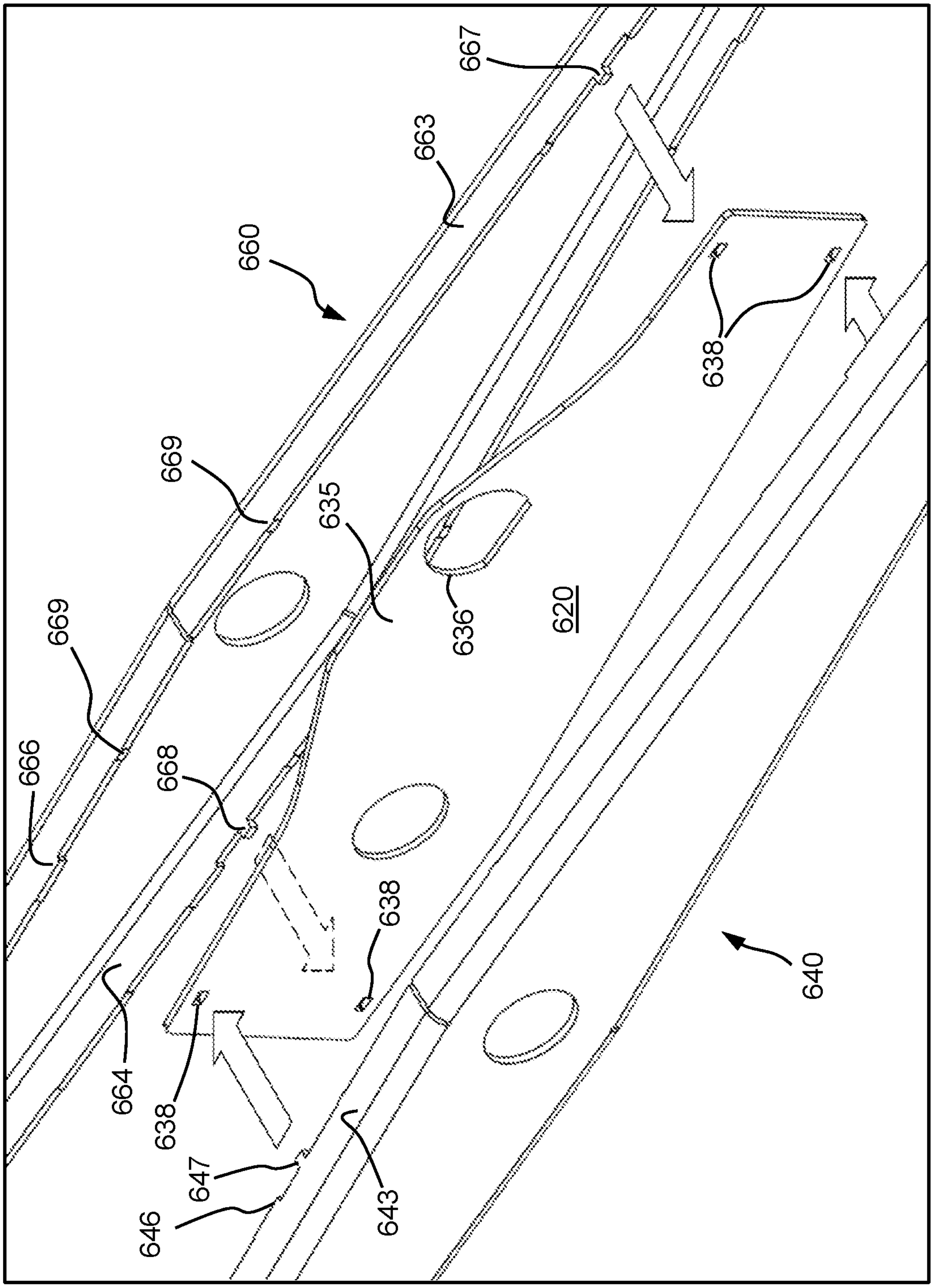
FIG. 6B shows a detailed exploded view of a portion of the scissor arm of FIG. 6A.

FIG. 6B more clearly illustrates the portions of the flanges of the first member 640 and the second member 660 that connect to one another. For example, as illustrated, the upper flange 643 of first member 640 includes a projection 646 that extends further inward than the portion of the upper flange 643 that abuts the central support structure 620. Likewise, the upper flange 663 of second member 660 also includes a projection 666 that extends further inward so as to meet the projection 646 of the upper flange 643 of the first member 640. Accordingly, these projections 646, 666 can extend around the central support structure 620 when the scissor arm 600 is assembled, and be directly connected to one another. Other portions along the length of the scissor arm may include similar projections. Likewise, the respective lower flanges may also include such projections so that the lower flanges may be coupled to one another.

In some implementations, the central support structure may include a first connection aperture and at least one of the upper flange or the lower flange of the first member may include a connection tab that is inserted into the first connection aperture of the central support structure. Such a configuration is shown in FIG. 6B. Central support structure 620 may include connection apertures 638 near each of the four corners thereof. Each of the first member 640 and the second member 660 may include two corresponding connection tabs. For example, the first member 640 may include an upper connection tab 647 on the upper flange 643 that fits into a connection aperture 638 toward the top of the central support structure 620 and a lower connection tab on the lower flange (which is obscured from view in FIG. 6B) that fits into a connection aperture 638 toward the bottom of the central support structure 620. Similarly, the second member 660 may include an upper connection tab 667 on the upper flange 663 that fits into a connection aperture 638 toward the top of the central support structure 620 and a lower connection tab 668 that fits into a connection aperture 638 toward the bottom of the central support structure 620. The insertion of the connection tabs into the connection apertures facilitate an interconnection of the components of the scissor arm 600. This interconnection may help strengthen the attachment of the components together. Moreover, the interconnection may also be beneficial during fabrication of the scissor arm, as the components can be easily held in place together before they are attached, such as by welding.

In some implementations, each of the first member 140 and the second member 160 is formed from a cut and bent metal plate. For example, the first member 140 may be formed from a metal plate where the overall shape of the first member 140 is first cut out from a larger plate of the material. The upper flange 143 may then be formed by creating a bend between the upper flange 143 and the outer wall 142. Similarly, the lower flange 144 may be formed by creating a bend between the lower flange 144 and the outer wall 142. The second member 160 may similarly be formed by cutting the appropriate shape from a metal plate and then bending the upper flange 163 and lower flange 164 with respect to the outer wall 162. Examples of metals that may be used for components of the scissor arm, including central support structure, first member and second member include high strength steels and high strength aluminum. For example, components of the scissor arm may be formed of a high strength steel that has sufficient malleability to bend, is configured for laser cutting and welding, and has a yield strength of at least 650 MPa. In other implementations, the first member 140 and the second member 160 may be stamped, molded or cast. Likewise, the central support structure may also be formed by cutting the material from a metal plate and optionally bending parts of the plate, or it may be stamped, molded or cast. Moreover, each of the components may be formed of a material other than metal, such as a reinforced polymer, such as fiberglass, a composite, or another material.

In some implementations, the components of the scissor arm may be formed of the same material, while in other implementations they may be formed of different materials. For example, the central support structure 120 may be formed of a first type of steel while the first member 140 and the second member 160 may be formed of a different type of steel. Likewise, the central support structure may be formed of metal, while the first member 140 and the second member 160 may be formed of a reinforced polymer material. Alternatively, the central support structure 120 may be formed of a reinforced polymer material, while the first member 140 and the second member 160 may be formed of a metal. The foregoing are only examples, and various other combinations of materials are also possible.

In some implementations, a material thickness of the first member 140 of the tubular body 110 and the second member 160 of the tubular body 110 may be the same as a material thickness of the central support structure 120. For example, the thickness of the bent plate forming the first member 140, the bent plate forming the second member 160, and the first plate 121 of the central support structure 120 may each be the same. In other embodiments the material thickness may be different. For example, in some embodiments, the first plate 121 of the central support structure 120 may have a greater thickness than the plate forming the first member 140 or the plate forming the second member 160.

In some implementations, a height of the tubular body 110 is smaller at the first end 101 than at a center point along a length of the tubular body 110. For instance, the tubular body 110 may have a smaller height at both the first end 101 and the second end 102 than at the central pivot 103, as a result of having one or two "knees" along the length of the scissor arm. For example, the scissor arm 100 shown in FIGS. 1A-1E has two knees, one knee on the upper side and one knee on the lower side of the scissor arm 100 such that the tubular body 110 has a diamond shape. In other embodiments, the scissor arm 100 may include a single knee and have a triangular shape. The relatively smaller heights at the first end 101 and second end 102 of the scissor arm 100 allows the scissor arm to fold down to a lower profile without limiting the height of the scissor arm 100 around the central pivot 103, where stresses may be greatest.

This diamond shape of the tubular body 110 may be created by forming the upper flange 143, 163 of each member 140, 160 of the tubular body from two sections that are separated by a notch 17, 167, respectively, at the apex of the diamond configuration. For example, the upper flange 163 may be formed by a pair of flaps on either side of the notch 166. These flaps may each be individually bent with respect to the outer wall 162 to form the upper flange 163. By bending the flaps individually on either side of the notch 166, the flaps can be angled with respect to one another so as to form the upper knee in the tubular body 110. The upper flange 143 of the first member 140 may be formed in a similar manner. Likewise, the lower flanges 144, 164 may also be created in a similar manner to form the lower knee.

III. Example Scissor Lifts

In some implementations, the description relates to a scissor lift for raising and lowering supported objects that includes at least one scissor arm as described in any of the implementations set forth above. Such a scissor lift may be used for lifting machinery, such as vehicles. In other implementations, the scissor lift may be used to lift other loads, such as people. Further, other implementations relate to articulating structures that incorporate the scissor arm other than lifts, such as other moving support structures. For instance, such a support structure may be provided in a compactor.

Figure 7:
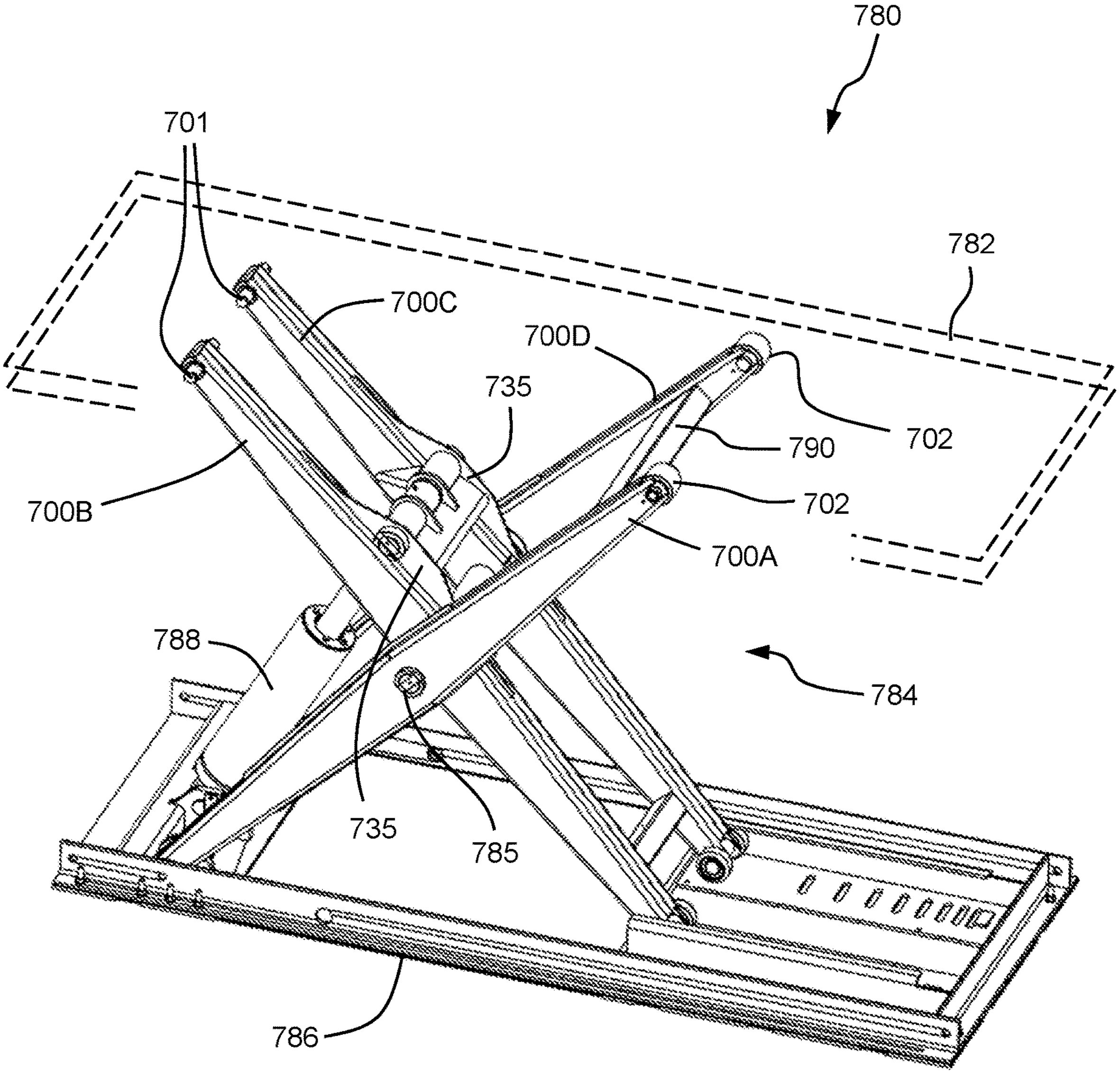
FIG. 7 shows a scissor lift in accordance with an example implementation.

FIG. 7 shows a scissor lift according to an example implementation. The scissor lift 780 may include a platform 782 that is supported by an articulating support structure 784 including a group of scissor arms 700A-700D. To illustrate details of the example articulating support structure 784, the platform 782 is shown with partial dashed lines. The articulating support structure 784 may be configured to raise or lower the platform through rotation of the scissor arms 700A-700D. Each of the scissor arms 700A-700D may be secured to the platform 782 at one end and to a base 786 at the other end. The scissor arms 700A-700D are coupled to a common fulcrum pin 785 between the ends, such that the platform-side ends of all of the scissor arms 700A-700D will move toward or away from the base together as the scissor arms 700A-700D rotate. Accordingly, the platform 782 may be raised or lowered with respect to the base.

In some implementations, each of the scissor arms 700A-700D in the articulating support structure 784 may have a configuration as set forth in any of the above implementations. In other words, each of the scissor arms may include any of the above-described scissor arms that include a tubular body formed of first and second members and a central support structure. Further, in some cases all of the scissor arms may have an identical configuration, while in other implementations the scissor arms may have different configurations. Moreover, in some implementations at least a portion of the scissor arms may not include the above-described central support structure and/or tubular body.

The group of scissor arms 700A-700D may include a pair of outer scissor arms 700A, 700D and a pair of inner scissor arms 700B, 700C positioned between the pair of outer scissor arms 700A, 700D. During operation, the pair of outer scissor arms 700A, 700D may be configured to rotate in a direction opposite to the direction of the pair of inner scissor arms 700B, 700C. For example, from the vantage shown in FIG. 7, as the platform 782 is raised, the outer scissor arms 700A, 700D may rotate in a counterclockwise direction while the inner scissor arms 700B, 700C may rotate in a clockwise direction. As the platform 782 is lowered, on the other hand, each of the scissor arms may rotate in the other direction. By grouping the scissor arms into a pair of outer scissor arms 700A, 700D that rotate together and a pair of inner scissor arms 700B, 700C that rotate together, the platform 782 may be symmetrically supported through the entire repositioning of the platform 782 up or down.

In some implementations, the inner scissor arms 700B, 700C may include respective central support structures that have a projection 735 for coupling to an actuator 788. For example, the inner scissor arms 700B, 700C shown in FIG. 7 may have a configuration similar to that of FIGS. 6A and 6B with a central support structure that extends outward from the tubular body to form a projection that includes an aperture for securing the projection to the actuator. For example, a pin that is attached to an end of the actuator 788 may pass through the apertures in the projections 735 of each of the inner scissor arms 700B, 700C. While the actuator 788 in FIG. 7 is coupled to the inner scissor arms, in other implementations the actuator 788 may be coupled to the outer scissor arms. Likewise, in some implementations, the actuator may be coupled to a single scissor arm in the articulating support structure 784.

The actuator 788 may be a hydraulic cylinder, such as illustrated in FIG. 7, which moves the articulating support structure 784 by adjusting the length of the hydraulic cylinder using hydraulic fluid. In other implementations, the actuator may be a motorized linear actuator, a gearing mechanism, or another type of actuator.

In some implementations, at least one of the scissor arms of the group of scissor arms is coupled to the platform by a pin and at least one other of the scissor arms of the group of scissor arms is coupled to the platform through a roller. For example, in the scissor lift 780 shown in FIG. 7, the upper ends of the inner scissor arms 700B, 700C are coupled to the platform 782 by a pin 701, which holds the upper ends of the inner scissor arms 700B, 700C in place on the platform 782 while allowing rotation of the inner scissor arms 700B, 700C. On the other hand, the upper ends of the outer scissor arms 700A, 700D are shown with a roller 702 that couples the outer scissor arms 700A, 700D in a manner that provides support but allows relative movement between the outer scissor arms 700A, 700D and the lower surface of the platform 782. For example, as the scissor lift 780 is lowered, and the upper ends of the inner scissor arms 700B, 700C move away from the upper ends of the outer scissor arms 700A, 700D, the rollers allow the upper ends of the outer scissor arms to move along the platform surface while maintaining support of the platform 782.

In some implementations, the articulating support structure may include a brace between two of the scissor arms. For example, articulating support structure 784 includes a brace 790, which may also be referred to as a tie bar, between the outer scissor arms 700A and 700D. The brace 790 may add strength to the articulating support structure 784 by constraining movement of the attached outer scissor arms 700A and 700D. The brace 790 between positioned near ends of the outer scissor arms 700A and 700D that have rollers 702. Accordingly, the additional strength provided by the brace 790 can be concentrated near the freely rolling ends of the outer scissor arms 700A and 700D to add a constraint to these ends of the scissor arms.

While the scissor lift 780 shown in FIG. 7 includes a single group of scissor arms that are each coupled to both the platform 782 and the base 786, in some implementations, the articulating support structure may include additional groups of scissor arms that increase the potential height of the articulating support structure between the platform and base. For example, the articulating support structure may include a first group of scissor arms, where each of the scissor arms is coupled to the platform, and a second group of scissor arms, where each of the scissor arms is coupled to the base. In such a case, each scissor arm in the second group may be coupled to a respective scissor arm in the first group, which approximately doubles the potential height that the articulating support structure may extend.

IV. Example Methods

Figure 8:
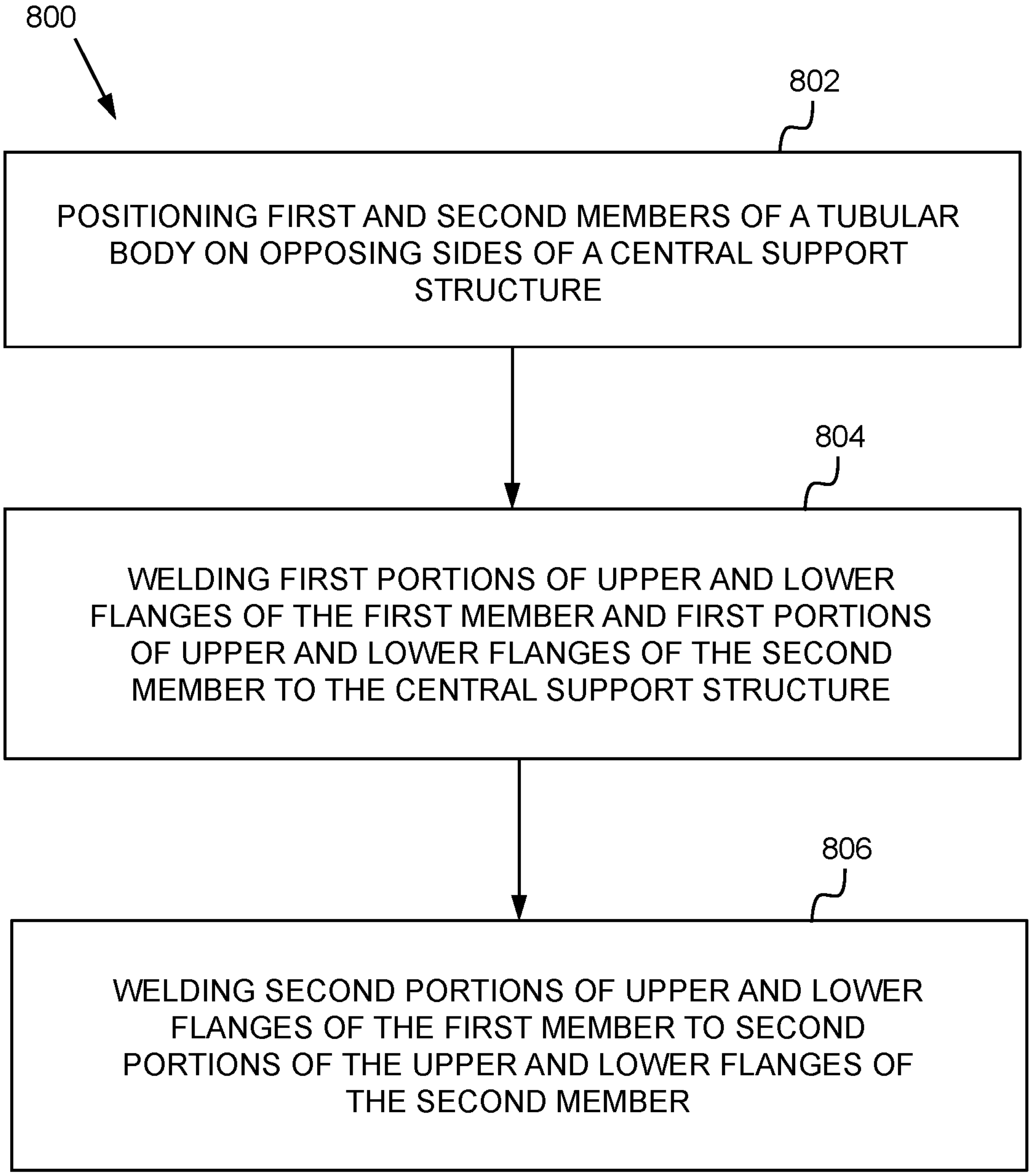
FIG. 8 shows a flowchart depicting a set of functions of a method in accordance with the example implementations.

In some implementations, the description relates to a method of fabricating a scissor arm as described in any of the implementations set forth above. A flow chart illustrating an example of such a method including various steps in fabricating the scissor arm is shown in FIG. 8. The steps in method 800 are described briefly in blocks 802, 804, and 806. These steps may be performed in sequence or at least some of the steps, or parts of some of the steps, may be performed simultaneously. Likewise, the steps may be performed in the listed order or in other orders.

As shown by block 802, the method 800 may include positioning first and second members of a tubular body on opposing sides of a central support structure, at least a portion of which extends in a plane. The positioning of the first and second members of the tubular body on opposing sides of the central support structure may provide an outer wall of each of the first and second members at a position that is spaced from the plane. Moreover, a first portion of an upper flange of the first member may be positioned adjacent to a first side of the central support structure and a first portion of a lower flange of the first member may be positioned adjacent to the first side of the central support structure. Likewise, a first portion of an upper flange of the second member may be positioned adjacent to a second side of the central support structure, and a first portion of a lower flange of the second member may be positioned adjacent to the second side of the central support structure.

It should be understood that the description of the first member and second member of the tubular body being positioned on opposing sides of the central support structure does not preclude portions of the members from extending around or through the central support structure. Rather, this description provides that a majority of the first member is positioned on one side of the central support structure while a majority of the second member is positioned on the other side of the central support structure.

As shown by block 804, the method 800 may include welding the central support structure to each of the first portion of the upper flange of the first member, the first portion of the lower flange of the first member, the first portion of the upper flange of the second member, and the first portion of lower flange of the second member. By welding the first and second members of the tubular body to the central support structure, these three components form a single structural element that is able to support various loads and may be able to withstand concentrated stresses.

In some implementations, positioning the first and second members of the tubular body on opposing sides of the central support structure may include placing a second portion of the upper flange of the first member adjacent to a second portion of the upper flange of the second member. Likewise, a second portion of the lower flange of the first member may be placed adjacent to a second portion of the lower flange of the second member. With this positioning, in some implementations, as shown by block 806, the method 700 may further include welding the second portion of the upper flange of the first member to the second portion of the upper flange of the second member and welding the second portion of the lower flange of the first member to the second portion of the lower flange of the second member. Welding portions of the first and second members of the tubular body to one another directly, in addition to welding other portions to the central support structure, may increase the strength of the scissor arm by having each component attached to the other components.

In some implementations, all of the welding of the method may be performed in a single pass. For example, the welding may be performed by a robotic welding machine without intermediate human intervention. Moreover, the positioning of the first and second members of the tubular body on opposing sides of the first plate may include securing the tubular body and the central support structure in a first position in a fixture. In some implementations, all of the welding of the method may then be performed while the tubular body and central support structure remain in the fixture and in the first position. Allowing all of the welding to take place while the components are held in a single position in a fixture can help increase efficiency of the fabrication process by removing the need for additional steps to reorient the components. For example, all of the welding may be performed without the need to move the components into new position after initial welding step in order to facilitate additional welding steps. Removing these repositioning steps can increase the speed of fabrication and reduce labor costs.

In some implementations, an edge of the upper flange of the first member may include a protrusion which may be placed against the central support structure so as to provide a welding space between the first portion of the upper flange of the first member and the central support structure. Similar protrusions may be provided on the lower flange of the first member, or on the upper or lower flanges of the second member. An example of such a protrusion is shown in the implementation depicted in FIG. 6B. As shown, the inner edge of the upper flange 663 of second member 660 includes a pair of small protrusions 669. When the second member 660 is placed against the central support structure 620, these protrusions 669 cause most of the inner edge of the upper flange 663 to be slightly spaced apart from the surface of central support structure 620. This spacing may allow for proper welding of the upper flange 663 to the central support structure.

In at least some implementations arranged as a method, the method can include one or more additional steps.

As an example, an additional step can include bending sheets to form the upper and lower flanges on the first and second members. For example, a cut metal sheet may be shaped using a press or bending machine to form a corner between the upper flange and the outer wall of the first member. In some embodiments, a pair of flaps that are separated by a notch may be bent over from the outer wall in order to form two sections of the upper flange that are disposed at an angle to one another so as to form an upper knee. Similar steps may be performed to create the lower flange with a lower knee. For example, the first member of the tubular body may be formed by performing two bends to form the upper flange and two additional bends to form the lower flange. Further, similar steps may be used to form the second member of the tubular body.

As another example, an additional step can include machining (e.g., by cutting with a laser), the upper and lower flanges of the first and second members to include one or more protrusions.

As yet another example, an additional step can include forming the central structure. Forming the central structure can, for example, include bending a metal plate to have a bent profile as described above. Additionally or alternatively, forming the central structure can include cutting a plate and bending a portion of the plate to form a reinforcing tab, such as a reinforcing tab described above.

As still yet another example, an additional step can include machining an aperture in a scissor arm. In at least some implementations, the aperture in the scissor arm includes a set of corresponding apertures, such as the apertures that allow for insertion of a fulcrum pin. In at least some of those implementations, each of those apertures can be machined into the scissor arm component (e.g., first member, second member, or central structure) before the scissor are components are affixed to each other. In at least some other implementations, two or more apertures of a set of corresponding apertures can be machined into the scissor arm components after the scissor arm components are affixed to each other. Machining the apertures according to these latter implementations many provide for a more precise alignment of those apertures.

V. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing implementations only, and is not intended to be limiting.

In this description, the articles "a," "an," and "the" are used to introduce elements and/or functions of the example implementations. The intent of using those articles is that there is one or more of the introduced elements and/or functions.

In this description, the intent of using the term "and/or" within a list of at least two elements or functions and the intent of using the terms "at least one of," "at least one of the following," "one or more of," "one or more from among," and "one or more of the following" immediately preceding a list of at least two components or functions is to cover each implementation including a listed component or function independently and each implementation including a combination of the listed components or functions. For example, an implementation described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible implementations: (i) an implementation including A, but not B and not C, (ii) an implementation including B, but not A and not C, (iii) an implementation including C, but not A and not B, (iv) an implementation including A and B, but not C, (v) an implementation including A and C, but not B, (v) an implementation including B and C, but not A, and/or (vi) an implementation including A, B, and C. For the implementations including component or function A, the implementations can include one A or multiple A. For the implementations including component or function B, the implementations can include one B or multiple B. For the implementations including component or function C, the implementations can include one C or multiple C. In accordance with the aforementioned example and at least some of the example implementations, "A" can represent a component, "B" can represent a system, and "C" can represent a symptom.

The use of ordinal numbers such as "first," "second," "third" and so on is to distinguish respective elements rather than to denote an order of those elements unless the context of using those terms explicitly indicates otherwise. Further, the description of a "first" element, such as a first plate, does not necessitate the presence of a second or any other element, such as a second plate.

Implementations of the present disclosure may thus relate to one of the enumerated example embodiments (EEEs) listed below.

EEE 1 is a scissor arm for an articulating support structure, the scissor arm being configured to rotate about an axis of rotation and comprising: a central support structure at least a portion of which extends in a plane that is perpendicular to the axis of rotation; and a tubular body comprising first and second members that form opposing sides of the scissor arm and are attached to the central support structure, each of the first and second member comprising: an outer wall spaced from the plane, an upper flange extending from the outer wall toward the plane, and a lower flange extending from the outer wall toward the plane.

EEE 2 is the scissor arm of EEE 1 wherein the central support structure includes a first plate that extends along the plane.

EEE 3 is the scissor arm of EEE 2, wherein the first plate extends from the upper flanges of the first and second members of the tubular body to the lower flanges of the first and second members of the tubular body.

EEE 4 is the scissor arm of EEE 2 or EEE 3, wherein the first plate is planar.

EEE 5 is the scissor arm of EEE 4, wherein the first plate has a bent profile.

EEE 6 is the scissor arm of EEE 5, wherein the first plate includes a lateral extension between an upper plate section and a lower plate section that contacts the outer wall of the first member of the tubular body.

EEE 7 is the scissor arm of EEE 6, wherein the lateral extension of the first plate is attached to the outer wall of the first member of the tubular body.

EEE 8 is the scissor arm of any one of EEEs 2 to 7, wherein the central support structure includes: a lower plate section disposed in the plane and positioned between the lower flanges of the first and second members, and an upper plate section disposed in the plane and positioned between the upper flanges of the first and second members.

EEE 9 is the scissor arm of any one of EEEs 2 to 8, wherein the central support structure includes a first reinforcing tab extending from the first plate to the outer wall of the first member.

EEE 10 is the scissor arm of EEE 9, wherein the first reinforcing tab is formed from a bent cutout of the first plate.

EEE 11 is the scissor arm of EEE 9 or EEE 10, wherein the first reinforcing tab is welded to the outer wall of the first member.

EEE 12 is the scissor arm of any one of EEEs 9 to 11, wherein a distance between the first reinforcing tab and a central aperture of the central support structure is no more than 10% of the length of the scissor arm.

EEE 13 is the scissor arm of any one of EEEs 9 to 12, wherein the central support structure includes a second reinforcing tab spaced from the first reinforcing tab and extending to the outer wall of the first member.

EEE 14 is the scissor arm of EEE 13, wherein the first reinforcing tab and the second reinforcing tab are positioned on opposite sides of a central aperture of the central support structure.

EEE 15 is the scissor arm of any one of EEEs 9 to 14, wherein the first reinforcing tab is one of a plurality of reinforcing tabs positioned along the length of the scissor arm.

EEE 16 is the scissor arm of any one of EEEs 9 to 15, wherein the central support structure includes an opposing reinforcing tab extending from the first plate to the outer wall of the second member.

EEE 17 is the scissor arm of any one of EEEs 2 to 15, wherein the central support structure includes a second plate that overlaps the first plate along the length of the scissor arm.

EEE 18 is the scissor arm of EEE 17, wherein the second plate is planar.

EEE 19 is the scissor arm of EEE 17, wherein the second plate has a bent profile.

EEE 20 is the scissor arm of EEE 19, wherein the second plate includes a lateral extension between an upper plate section and a lower plate section that contacts the outer wall of the second member of the tubular body.

EEE 21 is the scissor arm of EEE 20, wherein the lateral extension of the second plate is attached to the outer wall of the second member of the tubular body.

EEE 22 is the scissor arm of any one of EEEs 17 to 21, wherein the second plate is connected to the first plate by one or more spacers.

EEE 23 is the scissor arm of any one of EEEs 17 to 22, wherein the central support structure includes an opposing reinforcing tab extending from the second plate to the outer wall of the second member.

EEE 24 is the scissor arm of any one of EEEs 1 to 23, wherein a first section of the central support structure extends over a first portion of a length of the scissor arm.

EEE 25 is the scissor arm of EEE 24, wherein at least a portion of the first section of the central support structure is disposed between the first member and the second member along the first portion of the length of the scissor arm.

EEE 26 is the scissor arm of EEE 24 or EEE 25, wherein the upper flange of the first member is connected to the upper flange of the second member along a second portion of the length of the scissor arm.

EEE 27 is the scissor arm of any one of EEEs 24 to 26, wherein the lower flange of the first member is connected to the lower flange of the second member along the second portion of the length of the scissor arm.

EEE 28 is the scissor arm of EEE 26 or EEE 27 wherein the central support structure further comprises a second section extending over a third portion of the length of the scissor arm.

EEE 29 is the scissor arm of EEE 28, wherein the second section is positioned at a first end of the tubular body and includes an aperture adapted to couple the scissor arm to a pivot member.

EEE 30 is the scissor arm of any one of EEEs 26 to 29, wherein the upper flange of the first member is connected to the upper flange of the second member along a fourth portion of the length of the tubular body.

EEE 31 is the scissor arm of any one of EEEs 26 to 30, wherein the lower flange of the first member is connected to the lower flange of the second member along the fourth portion of the length of the tubular body.

EEE 32 is the scissor arm of EEE 30 or EEE 31, wherein the second portion of the length of the tubular body and the fourth portion of the length of the tubular body are on opposite sides of the first portion of the length of the tubular body.

EEE 33 is the scissor arm of any one of EEEs 1 to 32, wherein part of the central support structure extends outward from the tubular body so as to form a projection.

EEE 34 is the scissor arm of any one of EEEs 1 to 33, wherein the outer wall of the first member is spaced from the central support structure by the same distance as an outer wall of the second member.

EEE 35 is the scissor arm of any one of EEEs 1 to 33, wherein the outer wall of the first member is spaced from the central support structure by a different distance than the outer wall of the second member.

EEE 36 is the scissor arm of any one of EEEs 1 to 35, wherein at least a portion of the upper flange of the first member is connected to the upper flange of the second member at the plane.

EEE 37 is the scissor arm of any one of EEEs 1 to 36, wherein at least a portion of the lower flange of the first member is connected to the lower flange of the second member at the plane.

EEE 38 is the scissor arm of any one of EEEs 1 to 37, wherein the central support structure includes a first connection aperture, and wherein at least one of the upper flange or the lower flange of the first member includes a connection tab that is inserted into the first connection aperture of the central support structure.

EEE 39 is the scissor arm of any one of EEEs 1 to 38, wherein each of the first member and the second member is formed from a cut and bent metal plate.

EEE 40 is the scissor arm of any one of EEEs 1 to 39, wherein a material thickness of the first member and the second member is the same as a material thickness of the central support structure.

EEE 41 is the scissor arm of any one of EEEs 1 to 39, wherein a material thickness of the first member and the second member is different from a material thickness of the central support structure.

EEE 42 is the scissor arm of any one of EEEs 1 to 41, wherein a height of the tubular body is smaller at a first end than at a center point along a length of the tubular body.

EEE 43 is the scissor arm of any one of EEEs 1 to 42, wherein each of the first plate of the central support structure, the outer wall of the first member, and the outer wall of the second member includes a respective aperture configured to receive a pivot member.

EEE 44 is a scissor lift comprising: a platform; and an articulating support structure configured to raise and lower the platform, the articulating support structure comprising a group of scissor arms, wherein each of the scissor arms of the group of scissor arms is rotatable about a pivot member and includes an upper end coupled to the platform and wherein a first scissor arm of the group of scissor arms is a scissor arm according to any of EEEs 1 to 43.

EEE 45 is a scissor lift of EEE 44, wherein each of the scissor arms in the group of scissor arms is a scissor arm according to any of EEEs 1 to 43.

EEE 46 is a scissor lift of EEE 44 or EEE 45, wherein the group of scissor arms includes a pair of outer scissor arms and a pair of inner scissor arms positioned between the outer scissor arms, and wherein the pair of inner scissor arms are configured to rotate in an opposite direction to the pair of outer scissor arms.

EEE 47 is a scissor lift of EEE 46, wherein the first scissor arm is an inner scissor arm, wherein the central support structure extends outward from the tubular body so as to form a projection, and wherein the projection is coupled to an actuator.

EEE 48 is a scissor lift of EEE 47, wherein the actuator is a hydraulic cylinder.

EEE 49 is a scissor lift of any one of EEEs 44 to 48, wherein at least one of the scissor arms of the group of scissor arms is coupled to the platform by a pin and at least one other of the scissor arms of the group of scissor arms is coupled to the platform through a roller.

EEE 50 is a scissor lift of any one of EEEs 44 to 49, wherein the group of scissor arms is a first group of scissor arms, wherein the articulating support structure includes a second group of scissor arms, and wherein each scissor arm in the second group of scissor arms is coupled to a respective scissor arm in the first group of scissor arms.

EEE 51 is a method of fabricating the scissor arm of any of EEEs 1 to 43, the method comprising: positioning first and second members of a tubular body on opposing sides of a central support structure at least a portion of which extends in a plane such that: an outer wall of each of the first and second members is spaced from the plane, a first portion of an upper flange of the first member is adjacent to a first side of the central support structure, a first portion of a lower flange of the first member is adjacent to the first side of the central support structure, a first portion of an upper flange of the second member is adjacent to a second side of the central support structure, and a first portion of a lower flange of the second member is adjacent to the second side of the central support structure; and welding the central support structure to each of: the first portion of the upper flange of the first member, the first portion of the lower flange of the first member, the first portion of the upper flange of the second member, and the first portion of lower flange of the second member.

EEE 52 is the method of EEE 51, wherein the positioning the first and second members of the tubular body on opposing sides of the central support structure includes placing a second portion of the upper flange of the first member adjacent to a second portion of the upper flange of the second member and placing a second portion of the lower flange of the first member adjacent to a second portion of the lower flange of the second member, the method further comprising welding the second portion of the upper flange of the first member to the second portion of the upper flange of the second member and welding the second portion of the lower flange of the first member to the second portion of the lower flange of the second member.

EEE 53 is the method of EEE 51 or EEE 52, wherein positioning the first and second members of the tubular body on opposing sides of the central support structure includes securing the tubular body and the central support structure in a first position in a fixture, and wherein all of the welding is performed while the tubular body and central support structure are in the first position.

EEE 54 is the method of any one of EEEs 51 to 53, wherein each of the first and second members of the tubular body is formed by cutting and bending a metal sheet.

EEE 55 is the method of any one of EEEs 51 to 53, wherein an edge of the upper flange of the first member includes a protrusion, and wherein positioning the first and second members of the tubular body on opposing sides of the central support structure includes placing the protrusion against the central support structure so as to provide a welding space between the first portion of the upper flange of the first member and the central support structure.

What is claimed is:

1. A scissor arm for an articulating support structure, the scissor arm being configured to rotate about an axis of rotation and comprising:
- a central support structure at least a portion of which extends in a plane that is perpendicular to the axis of rotation; and
- a tubular body comprising first and second members that form opposing sides of the scissor arm and are attached to the central support structure, each of the first and second member comprising:
  - an outer wall spaced from the plane,
  - an upper flange extending from the outer wall toward the plane, and
  - a lower flange extending from the outer wall toward the plane,
- wherein a distance between the outer wall of the first member and the central support structure is the same as a distance between the outer wall of the second member and the central support structure.

2. The scissor arm according to claim 1, wherein the central support structure includes:
- a lower plate section disposed in the plane and positioned between the lower flanges of the first and second members, and
- an upper plate section disposed in the plane and positioned between the upper flanges of the first and second members.

3. The scissor arm according to claim 1, wherein a first section of the central support structure extends over a first portion of a length of the scissor arm.

4. The scissor arm according to claim 3, wherein at least a portion of the first section of the central support structure is disposed between the first member and the second member along the first portion of the length of the scissor arm.

5. The scissor arm according to claim 4, wherein the upper flange of the first member is connected to the upper flange of the second member along a second portion of the length of the scissor arm.

6. The scissor arm according to claim 5, wherein the central support structure further comprises a second section extending over a third portion of the length of the scissor arm.

7. The scissor arm according to claim 6, wherein the second section is positioned at a first end of the tubular body and includes an aperture adapted to couple the scissor arm to a pivot member.

8. The scissor arm according to claim 1, wherein part of the central support structure extends outward from the tubular body so as to form a projection.

9. The scissor arm according to claim 1, wherein the central support structure includes a first plate extending along the plane from the upper flanges to the lower flanges.

10. The scissor arm according to claim 9, wherein the central support structure includes a reinforcing tab extending from the first plate to the outer wall of the first member.

11. The scissor arm according to claim 10, wherein the reinforcing tab is welded to the outer wall of the first member.

12. The scissor arm according to claim 1, wherein the central support structure includes a first connection aperture, and wherein at least one of the upper flange or the lower flange of the first member includes a connection tab that is inserted into the first connection aperture of the central support structure.

13. The scissor arm according to claim 1, wherein each of the first member and the second member is formed from a cut and bent metal plate.

14. The scissor arm according to claim 1, wherein each of the central support structure, the outer wall of the first member, and the outer wall of the second member includes a respective aperture configured to receive a pivot member.

15. The scissor arm according to claim 1, wherein a height of the tubular body is smaller at a first end than at a center point along a length of the tubular body.

16. The scissor arm according to claim 1, wherein a material thickness of the first member of the tubular body is the same as a material thickness of the central support structure.

17. A scissor lift comprising:
- a platform; and
- an articulating support structure configured to raise and lower the platform, the articulating support structure comprising a group of scissor arms,
- wherein each of the scissor arms of the group of scissor arms is rotatable about a pivot member and includes an upper end coupled to the platform and
- wherein a first scissor arm of the group of scissor arms is rotatable about an axis of rotation and comprises:
  - a central support structure, at least a portion of which extends in a plane that is perpendicular to the axis of rotation; and
  - a tubular body comprising first and second members that are respectively disposed on opposing sides of the first scissor arm and are attached to the central support structure, wherein each of the first and second members includes an outer wall spaced from the plane, an upper flange extending from the outer wall toward the plane, and a lower flange extending from the outer wall toward the plane,
  - wherein a distance between the outer wall of the first member and the central support structure is the same as a distance between the outer wall of the second member and the central support structure.

18. The scissor lift according to claim 17, wherein each of the scissor arms in the group of scissor arms includes a respective central support structure and a respective tubular body with first and second members.

19. The scissor lift according to claim 17, wherein the group of scissor arms includes a pair of outer scissor arms and a pair of inner scissor arms positioned between the pair of outer scissor arms, and wherein the pair of inner scissor arms are configured to rotate in an opposite direction to the pair of outer scissor arms.

20. A scissor lift comprising:

a platform; and an articulating support structure configured to raise and lower the platform, the articulating support structure comprising a group of scissor arms, wherein each of the scissor arms of the group of scissor arms is rotatable about a pivot member and includes an upper end coupled to the platform and wherein a first scissor arm of the group of scissor arms comprises:

a central support structure, at least a portion of which extends in a plane that is perpendicular to an axis of rotation; and a tubular body comprising first and second members that are respectively disposed on opposing sides of the first scissor arm and are attached to the central support structure, wherein each of the first and second members includes an outer wall spaced from the plane, an upper flange extending from the outer wall toward the plane, and a lower flange extending from the outer wall toward the plane, wherein the central support structure extends outward from the tubular body so as to form a projection, and wherein the projection is coupled to an actuator.

21. A method of fabricating a scissor arm configured to rotate about an axis of rotation, the method comprising:

positioning first and second members of a tubular body on opposing sides of a central support structure at least a portion of which extends in a plane such that:

an outer wall of each of the first and second members is spaced from the plane and a distance between the outer wall of the first member and the central support structure is the same as a distance between the outer wall of the second member and the central support structure, a first portion of an upper flange of the first member is adjacent to a first side of the central support structure, a first portion of a lower flange of the first member is adjacent to the first side of the central support structure, a first portion of an upper flange of the second member is adjacent to a second side of the central support structure, and a first portion of a lower flange of the second member is adjacent to the second side of the central support structure; and welding the central support structure to each of:

the first portion of the upper flange of the first member, the first portion of the lower flange of the first member, the first portion of the upper flange of the second member, and the first portion of the lower flange of the second member.

22. The method according to claim 21, wherein the positioning the first and second members of the tubular body on opposing sides of the central support structure includes placing a second portion of the upper flange of the first member adjacent to a second portion of the upper flange of the second member and placing a second portion of the lower flange of the first member adjacent to a second portion of the lower flange of the second member, the method further comprising welding the second portion of the upper flange of the first member to the second portion of the upper flange of the second member and welding the second portion of the lower flange of the first member to the second portion of the lower flange of the second member.

23. The method according to claim 21, wherein positioning the first and second members of the tubular body on opposing sides of the central support structure includes securing the tubular body and central support structure in a first position in a fixture, and wherein all of the welding is performed while the tubular body and central support structure are in the first position.

24. The method according to claim 21, wherein each of the first and second members of the tubular body is formed by cutting and bending a metal sheet.

25. The method according to claim 21, wherein an edge of the upper flange of the first member includes a protrusion, and wherein positioning the first and second members of the tubular body on opposing sides of the central support structure includes placing the protrusion against the central support structure so as to provide a welding space between the first portion of the upper flange of the first member and the central support structure.

* * * * *